US009900757B2

(12) United States Patent
 Li et al.

(10) Patent No.: US 9,900,757 B2
(45) Date of Patent: Feb. 20, 2018

(54) WEARABLE DEVICE-BASED INFORMATION TRANSFER METHOD AND RELATED DEVICE

(71) Applicant: Huawei Technologies Co., Ltd., Shenzhen (CN)

(72) Inventors: Stephen Sui Luen Li, Shenzhen (CN); Bo Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/263,508

(22) Filed: Sep. 13, 2016

(65) Prior Publication Data

US 2016/0381536 A1 Dec. 29, 2016

Related U.S. Application Data

(63) Continuation of application No. PCT/CN2015/095068, filed on Nov. 19, 2015.

(30) Foreign Application Priority Data

Mar. 31, 2015 (CN) .......................... 2015 1 0149714

(51) Int. Cl.
 *H04B 5/00* (2006.01)
 *H04W 4/20* (2018.01)
 (Continued)

(52) U.S. Cl.
 CPC ............ *H04W 4/206* (2013.01); *G06F 3/017* (2013.01); *G06F 17/30* (2013.01);
 (Continued)

(58) Field of Classification Search
 CPC ..... H04W 12/06; H04W 4/008; H04W 12/04; H04W 4/001; H04W 4/02; H04W 76/023;
 (Continued)

(56) References Cited

U.S. PATENT DOCUMENTS

2006/0256074 A1  11/2006  Krum et al.
2014/0096179 A1*  4/2014  Ben-Shalom ....... H04L 63/0869
                                         726/1
(Continued)

FOREIGN PATENT DOCUMENTS

CN     103475754 A    12/2013
CN     103490990 A     1/2014
CN     104767807 A     7/2015

OTHER PUBLICATIONS

Machine Translation and Abstract of Chinese Patent Application No. CN103475754, Dec. 25, 2013, 4 pages.
(Continued)

*Primary Examiner* — Ajibola Akinyemi
(74) *Attorney, Agent, or Firm* — Conley Rose, P.C.

(57) ABSTRACT

A wearable device-based information transfer method and a related device where the method includes recording, by a first wearable device, a first event parameter corresponding to a social action when detecting that a first user wearing the first wearable device performs the social action, obtaining, by the first wearable device, a second event parameter released by a second wearable device, and determining, by the first wearable device, whether the first event parameter matches the second event parameter, and sending, by the first wearable device, first user-defined information to the second wearable device when the first event parameter matches the second event parameter. Hence, information transfer efficiency may be effectively improved.

22 Claims, 6 Drawing Sheets

(51) Int. Cl.
  *H04L 29/08* (2006.01)
  *H04W 4/00* (2018.01)
  *G06F 17/30* (2006.01)
  *G06F 3/01* (2006.01)
  *G06Q 10/10* (2012.01)
  *G06K 9/00* (2006.01)
  *G06Q 50/00* (2012.01)
  *H04M 1/2745* (2006.01)
  *H04M 1/725* (2006.01)
  *H04W 4/02* (2018.01)

(52) U.S. Cl.
  CPC ......... *G06K 9/00355* (2013.01); *G06Q 10/10* (2013.01); *G06Q 10/107* (2013.01); *G06Q 50/01* (2013.01); *H04B 5/0031* (2013.01); *H04L 29/08* (2013.01); *H04L 67/18* (2013.01); *H04L 67/22* (2013.01); *H04L 67/24* (2013.01); *H04L 67/306* (2013.01); *H04M 1/274516* (2013.01); *H04M 1/7253* (2013.01); *H04W 4/008* (2013.01); *H04W 4/02* (2013.01)

(58) Field of Classification Search
  CPC ..... H04W 84/18; H04W 12/08; H04W 4/021; H04W 4/08; H04W 76/02; H04W 84/12; H04W 12/02; H04W 12/12; H04W 28/26
  USPC ........................................................ 455/41.1
  See application file for complete search history.

(56) References Cited

U.S. PATENT DOCUMENTS

| | | | |
|---|---|---|---|
| 2014/0148094 A1 | 5/2014 | Park et al. | |
| 2014/0149514 A1 | 5/2014 | Ryan et al. | |
| 2015/0147968 A1 | 5/2015 | Friedman et al. | |
| 2016/0006850 A1* | 1/2016 | Ohki | H04M 1/7253 455/557 |
| 2016/0346690 A1* | 12/2016 | Ramachandran | A63F 13/12 |

OTHER PUBLICATIONS

Machine Translation and Abstract of Chinese Patent Application No. CN104767807, Jul. 8, 2015, 4 pages.

Foreign Communication From a Counterpart Application, European Application No. 15882281.7, Extended European Search Report dated Apr. 5, 2017, 8 pages.

Foreign Communication From a Counterpart Application, PCT Application No. PCT/CN2015/095068, English Translation of International Search Report dated Feb. 14, 2016, 2 pages.

Foreign Communication From a Counterpart Application, PCT Application No. PCT/CN2015/095068, Written Opinion dated Feb. 14, 2016, 5 pages.

\* cited by examiner

WEARABLE DEVICE-BASED INFORMATION TRANSFER METHOD AND RELATED DEVICE

CROSS-REFERENCE TO RELATED APPLICATIONS

This application is a continuation application of international patent application number PCT/CN2015/095068 filed on Nov. 19, 2015, which claims priority to Chinese patent application number 201510149714.3 filed on Mar. 31, 2015, both of which are incorporated by reference.

TECHNICAL FIELD

The present disclosure relates to the field of communications technologies, and in particular, to a wearable device-based information transfer method and a related device.

BACKGROUND

In a business environment, contact card transfer is widely used as an information transfer method by business persons. In addition to including transfer of conventional paper contact cards, contact card transfer further includes transfer of newly-popular electronic contact cards. In actual application, a user may transfer an electronic contact card by operating a smartphone. For example, a user may operate a smartphone to scan surrounding user equipment (such as a mobile phone and a tablet computer), and the user may operate the smartphone to select any scanned user equipment as an interactive object. Further, the user may operate the smartphone to select an electronic contact card and transfer the electronic contact card to the user equipment that is used as the interactive object, thereby implementing transfer of the electronic contact card. However, it is found in practice that the foregoing manner of transferring an electronic contact card requires a user to perform troublesome manual operations, which reduces information transfer efficiency.

SUMMARY

Embodiments of the present disclosure disclose a wearable device-based information transfer method and a related device, which can effectively improve information transfer efficiency.

A first aspect of the embodiments of the present disclosure discloses a wearable device-based information transfer method, including recording, by a first wearable device, a first event parameter corresponding to a social action when detecting that a first user wearing the first wearable device performs the social action, where the first event parameter includes a first event time, a first event site, or an identifier of the first user, obtaining, by the first wearable device, a second event parameter released by a second wearable device, where the second event parameter includes a second event time, a second event site, or an identifier of a second user, and the second event parameter is an event parameter recorded by the second wearable device when the second wearable device detects that the second user wearing the second wearable device performs a social action, and determining, by the first wearable device, whether the first event parameter matches the second event parameter, and sending, by the first wearable device, first user-defined information to the second wearable device if the first event parameter matches the second event parameter.

In a first possible implementation manner of the first aspect of the embodiments of the present disclosure, determining, by the first wearable device, whether the first event parameter matches the second event parameter includes determining, by the first wearable device, whether the first event time matches the second event time, and/or determining whether the first event site matches the second event site, and/or determining whether the identifier of the first user matches the identifier of the second user.

With reference to the first possible implementation manner of the first aspect of the embodiments of the present disclosure, in a second possible implementation manner of the first aspect of the embodiments of the present disclosure, the first event time includes a first event start time and first event duration, and the second event time includes a second event start time and second event duration, and determining, by the first wearable device, whether the first event time matches the second event time includes determining, by the first wearable device, whether a difference between the first event start time and the second event start time is less than a first set threshold, determining, by the first wearable device, whether a difference between the first event duration and the second event duration is less than a second set threshold if the difference between the first event start time and the second event start time is less than the first set threshold, and determining that the first event time matches the second event time if the difference between the first event duration and the second event duration is less than the second set threshold. Determining, by the first wearable device, whether the first event site matches the second event site includes determining, by the first wearable device, whether the first event site is the same as the second event site, and determining that the first event site matches the second event site if the first event site is the same as the second event site, or determining, by the first wearable device, whether a distance between the first event site and the second event site is less than a preset threshold, and determining that the first event site matches the second event site if the distance between the first event site and the second event site is less than the preset threshold, and determining, by the first wearable device, whether the identifier of the first user matches the identifier of the second user includes determining, by the first wearable device, whether the identifier of the first user and the identifier of the second user belong to user identifiers of a same relationship chain, and determining that the identifier of the first user matches the identifier of the second user if the identifier of the first user and the identifier of the second user belong to the user identifiers of the same relationship chain.

With reference to the first aspect of the embodiments of the present disclosure or either of the first and second possible implementation manners of the first aspect of the embodiments of the present disclosure, in a third possible implementation manner of the first aspect of the embodiments of the present disclosure, the method further includes detecting, by the first wearable device, whether a social statement occurs when detecting that the first user wearing the first wearable device performs a social action, and executing the step of obtaining a second event parameter released by a second wearable device if a social statement occurs.

With reference to the third possible implementation manner of the first aspect of the embodiments of the present disclosure, in a fourth possible implementation manner of the first aspect of the embodiments of the present disclosure, obtaining, by the first wearable device, a second event parameter released by a second wearable device includes obtaining, by the first wearable device using an available network connection capability of the first wearable device, the second event parameter released by the second wearable device, and/or obtaining, by the first wearable device using an available network connection capability of a first smart device, the second event parameter released by the second wearable device, where the first wearable device has a communication connection with the first smart device, and sending, by the first wearable device, first user-defined information to the second wearable device includes sending, by the first wearable device, the first user-defined information to the second wearable device using the available network connection capability of the first wearable device, and/or sending, by the first wearable device, the first user-defined information to the second wearable device using the available network connection capability of the first smart device.

With reference to the fourth possible implementation manner of the first aspect of the embodiments of the present disclosure, in a fifth possible implementation manner of the first aspect of the embodiments of the present disclosure, the method further includes releasing, by the first wearable device, the first event parameter using the available network connection capability of the first wearable device, and/or releasing, by the first wearable device, the first event parameter using the available network connection capability of the first smart device.

With reference to the fifth possible implementation manner of the first aspect of the embodiments of the present disclosure, in a sixth possible implementation manner of the first aspect of the embodiments of the present disclosure, the method further includes acquiring, by the first wearable device using the available network connection capability of the first wearable device, second user-defined information sent by the second wearable device, and/or acquiring, by the first wearable device using the available network connection capability of the first smart device, second user-defined information sent by the second wearable device, where the second user-defined information is sent to the first wearable device by the second wearable device after the second wearable device acquires the first event parameter and determines that the first event time matches the second event time and that the first event site matches the second event site.

With reference to the sixth possible implementation manner of the first aspect of the embodiments of the present disclosure, in a seventh possible implementation manner of the first aspect of the embodiments of the present disclosure, after the first wearable device determines that the first event parameter matches the second event parameter, the method further includes sending, by the first wearable device, a first user-defined rule to the first smart device such that the first smart device triggers, according to the first user-defined rule, an authorized Internet of Things (IOT) device to provide a service, where the first user-defined rule includes identifier information of at least one authorized IOT device.

With reference to the seventh possible implementation manner of the first aspect of the embodiments of the present disclosure, in an eighth possible implementation manner of the first aspect of the embodiments of the present disclosure, the first user-defined rule further includes identifier information of at least one authorized third-party search engine, and the second user-defined information includes personal information, and the method further includes sending, by the first wearable device, the second user-defined information and the first user-defined rule to a cloud server through the first smart device, and acquiring, by the first wearable device through the first smart device, second user background information sent by the cloud server, where the second user background information is second user background information that is obtained by the cloud server through the authorized third-party search engine after the cloud server extracts a keyword from the personal information included in the second user-defined information and that matches the keyword.

With reference to the eighth possible implementation manner of the first aspect of the embodiments of the present disclosure, in a ninth possible implementation manner of the first aspect of the embodiments of the present disclosure, the second user-defined information further includes an authorized third-party service information entrance, and the method further includes acquiring, by the first wearable device through the first smart device, third-party service information sent by the cloud server, where the third-party service information is third-party service information that is acquired from a third-party service system by the cloud server through the third-party service information entrance.

With reference to the ninth possible implementation manner of the first aspect of the embodiments of the present disclosure, in a tenth possible implementation manner of the first aspect of the embodiments of the present disclosure, the second user-defined information further includes identifier information of an authorized sign detection device, and the method further includes acquiring, by the first wearable device through the first smart device, second user sign data synchronization information sent by the cloud server, where the second user sign data synchronization information is sent to the cloud server by the authorized sign detection device through a second smart device, and the second wearable device keeps a communication connection with the second smart device.

With reference to the first aspect of the embodiments of the present disclosure or either of the first and second possible implementation manners of the first aspect of the embodiments of the present disclosure, in an eleventh possible implementation manner of the first aspect of the embodiments of the present disclosure, the first user-defined information includes personal information, an authorized third-party service information entrance, and status information of an authorized sign detection device.

A second aspect of the embodiments of the present disclosure discloses a wearable device, including a recording unit configured to record a first event parameter corresponding to a social action when it is detected that a first user wearing the wearable device performs the social action, where the first event parameter includes a first event time, a first event site, or an identifier of the first user, a first acquiring unit configured to obtain a second event parameter released by a second wearable device, where the second event parameter includes a second event time, a second event site, or an identifier of a second user, and the second event parameter is an event parameter recorded by the second wearable device when the second wearable device detects that the second user wearing the second wearable device performs a social action, a first determining unit configured to determine whether the first event parameter matches the second event parameter, and a sending unit configured to send first user-defined information to the second wearable device when a determining result of the first determining unit is that the first event parameter matches the second event parameter.

In a first possible implementation manner of the second aspect of the embodiments of the present disclosure, the first determining unit is configured to determine whether the first event time matches the second event time, and/or configured to determine whether the first event site matches the second event site, and/or configured to determine whether the identifier of the first user matches the identifier of the second user.

With reference to the first possible implementation manner of the second aspect of the embodiments of the present disclosure, in a second possible implementation manner of the second aspect of the embodiments of the present disclosure, the first event time includes a first event start time and first event duration, and the second event time includes a second event start time and second event duration, and that the first determining unit determines whether the first event time matches the second event time includes the first determining unit determines whether a difference between the first event start time and the second event start time is less than a first set threshold, determines whether a difference between the first event duration and the second event duration is less than a second set threshold if the difference between the first event start time and the second event start time is less than the first set threshold, and determines that the first event time matches the second event time if the difference between the first event duration and the second event duration is less than the second set threshold. The manner in which the first determining unit determines whether the first event site matches the second event site includes that the first determining unit determines whether the first event site is the same as the second event site, and determines that the first event site matches the second event site if the first event site is the same as the second event site, or the first determining unit determines whether a distance between the first event site and the second event site is less than a preset threshold, and determines that the first event site matches the second event site if the distance between the first event site and the second event site is less than the preset threshold, and the manner in which the first determining unit determines whether the identifier of the first user matches the identifier of the second user includes that the first determining unit determines whether the identifier of the first user and the identifier of the second user belong to user identifiers of a same relationship chain, and determines that the identifier of the first user matches the identifier of the second user if the identifier of the first user and the identifier of the second user belong to the user identifiers of the same relationship chain.

With reference to the second aspect of the embodiments of the present disclosure or either of the first and second possible implementation manners of the second aspect of the embodiments of the present disclosure, in a third possible implementation manner of the second aspect of the embodiments of the present disclosure, the wearable device further includes a social statement detection unit configured to detect whether a social statement occurs when it is detected that the first user wearing the wearable device performs a social action, and trigger the first acquiring unit to execute the operation of obtaining a second event parameter released by a second wearable device if a social statement occurs.

With reference to the third possible implementation manner of the second aspect of the embodiments of the present disclosure, in a fourth possible implementation manner of the second aspect of the embodiments of the present disclosure, the first acquiring unit is configured to obtain, using an available network connection capability of the wearable device, the second event parameter released by the second wearable device, and/or the first acquiring unit obtains, using an available network connection capability of a first smart device, the second event parameter released by the second wearable device, where the wearable device has a communication connection with the first smart device, and a manner used by the sending unit to send the first user-defined information to the second wearable device is that the sending unit is configured to send the first user-defined information to the second wearable device using the available network connection capability of the wearable device, and/or configured to send the first user-defined information to the second wearable device using the available network connection capability of the first smart device.

With reference to the fourth possible implementation manner of the second aspect of the embodiments of the present disclosure, in a fifth possible implementation manner of the second aspect of the embodiments of the present disclosure, the wearable device further includes a releasing unit configured to release the first event parameter using the available network connection capability of the wearable device, and/or configured to release the first event parameter using the available network connection capability of the first smart device.

With reference to the fifth possible implementation manner of the second aspect of the embodiments of the present disclosure, in a sixth possible implementation manner of the second aspect of the embodiments of the present disclosure, the wearable device further includes a second acquiring unit configured to acquire, using the available network connection capability of the wearable device, second user-defined information sent by the second wearable device, and/or configured to acquire, using the available network connection capability of the first smart device, second user-defined information sent by the second wearable device, where the second user-defined information is sent to the wearable device by the second wearable device after the second wearable device acquires the first event parameter and determines that the first event time matches the second event time and that the first event site matches the second event site.

With reference to the sixth possible implementation manner of the second aspect of the embodiments of the present disclosure, in a seventh possible implementation manner of the second aspect of the embodiments of the present disclosure, the sending unit is further configured to send a first user-defined rule to the first smart device such that the first smart device triggers, according to the first user-defined rule, an authorized IOT device to provide a service after the first determining unit determines that the first event parameter matches the second event parameter, where the first user-defined rule includes identifier information of at least one authorized IOT device.

With reference to the seventh possible implementation manner of the second aspect of the embodiments of the present disclosure, in an eighth possible implementation manner of the second aspect of the embodiments of the present disclosure, the first user-defined rule further includes identifier information of at least one authorized third-party search engine, and the second user-defined information includes personal information, where the sending unit is further configured to send the second user-defined information and the first user-defined rule to a cloud server through the first smart device, and the second acquiring unit is further configured to acquire, through the first smart device, second user background information sent by the cloud server, where the second user background information is second user background information that is obtained by the cloud server through the authorized third-party search engine after the cloud server extracts a keyword from the personal information included in the second user-defined information and that matches the keyword.

With reference to the eighth possible implementation manner of the second aspect of the embodiments of the present disclosure, in a ninth possible implementation manner of the second aspect of the embodiments of the present disclosure, the second user-defined information further includes an authorized third-party service information entrance, where the second acquiring unit is further configured to acquire, through the first smart device, third-party service information sent by the cloud server, where the third-party service information is third-party service information that is acquired from a third-party service system by the cloud server through the third-party service information entrance.

With reference to the ninth possible implementation manner of the second aspect of the embodiments of the present disclosure, in a tenth possible implementation manner of the second aspect of the embodiments of the present disclosure, the second user-defined information further includes identifier information of an authorized sign detection device, where the second acquiring unit is further configured to acquire, through the first smart device, second user sign data synchronization information sent by the cloud server, where the second user sign data synchronization information is sent to the cloud server by the authorized sign detection device through a second smart device, and the second wearable device keeps a communication connection with the second smart device.

With reference to the second aspect of the embodiments of the present disclosure or either of the first and second possible implementation manners of the second aspect of the embodiments of the present disclosure, in an eleventh possible implementation manner of the second aspect of the embodiments of the present disclosure, the first user-defined information includes personal information, an authorized third-party service information entrance, and status information of an authorized sign detection device.

In the embodiments of the present disclosure, a first wearable device may record a first event parameter corresponding to a social action and including a first event time, a first event site, or an identifier of a first user when detecting that the first user wearing the first wearable device performs the social action, correspondingly, a second wearable device may record a second event parameter including a second event time, a second event site, or an identifier of a second user, and release the second event parameter when detecting that the second user wearing the second wearable device performs another social action. In this way, after the first wearable device acquires the second event parameter released by the second wearable device, the first wearable device can determine that the second wearable device is used as a transfer object if determining that the first event parameter matches the second event parameter, accordingly, the first wearable device may send first user-defined information to the second wearable device. It can be seen that, according to the embodiments of the present disclosure, troublesome manual operations performed during transfer of information including an electronic contact card can be omitted, which can effectively improve information transfer efficiency. In addition, according to the embodiments of the present disclosure, information can be efficiently transferred without a manual operation performed by a user for selecting a transfer object and information and without perception of the user, which can improve user experience in a business environment.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a wearable device-based information transfer method and a related device, which can effectively improve information transfer efficiency. The following separately provides detailed description.

Figure 1:
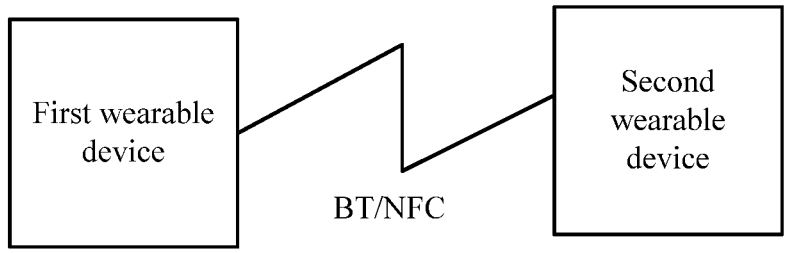
FIG. 1 is a schematic diagram of a first networking architecture according to an embodiment of the present disclosure.

To have a better understanding of the wearable device-based information transfer method and the related device that are disclosed in the embodiments of the present disclosure, the following first describes networking architectures applicable to the embodiments of the present disclosure. Referring to FIG. 1, FIG. 1 is a schematic diagram of a first networking architecture according to an embodiment of the present disclosure. As shown in FIG. 1, the networking architecture may include a first wearable device and a second wearable device. Both the first wearable device and the second wearable device are independent wearable devices, that is, the first wearable device and the second wearable device are not connected to another smart device such as a mobile phone or a tablet computer. For example, in some business environments, the first wearable device and the second wearable device may be respectively carried by two different business persons. Moreover, the first wearable device and the second wearable device are not connected to other smart devices such as mobile phones and tablet computers of the business persons. The first wearable device and the second wearable device include but are not limited to smart wearable devices such as smart watches, smart bands, smart wrist straps, smart glasses, smart necklaces, smart finger rings, and smart earrings. In actual application, the first wearable device and the second wearable device can provide available network connection capabilities such as BLUETOOTH (BT), near field communication (NFC), WIFI, and ZIGBEE. Moreover, the first wearable device and the second wearable device may further have built-in sensors such as an accelerometer, a gyroscope, a magnetometer, a light sensor, a global positioning system (GPS), a heart rate sensor, a blood oxygen sensor, and an electroencephalogram sensor, and input/output (I/O) parts such as a microphone and a speaker. In actual application, in addition to obtaining time information according to a clock, the first wearable device and the second wearable device may further effectively detect users' actions (such as a handshake, an embrace, running, and walking), user sign data (such as a heart rate, electroencephalogram, blood oxygen, blood pressure, and an electroencephalogram status), and a site (namely a location) using the foregoing sensors. Based on the networking architecture shown in FIG. 1, troublesome manual operations performed during transfer of information including an electronic contact card can be omitted between the first wearable device and the second wearable device, which can effectively improve information transfer efficiency. In addition, based on the networking architecture shown in FIG. 1, information is efficiently transferred between the first wearable device and the second wearable device without a manual operation performed by a user for selecting a transfer object and information and without perception of the user, which can improve user experience in a business environment.

Figure 2:
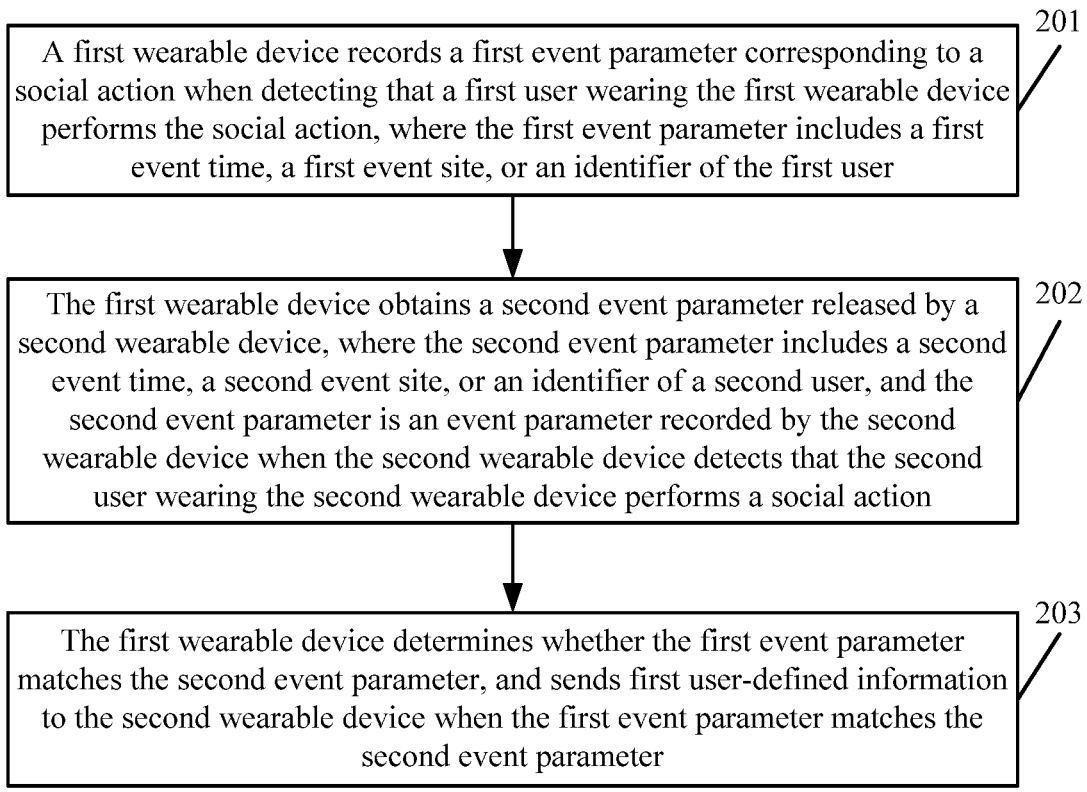
FIG. 2 is a schematic flowchart of a wearable device-based information transfer method according to an embodiment of the present disclosure.

Based on the networking architecture shown in FIG. 1, an embodiment of the present disclosure discloses a wearable device-based information transfer method. Referring to FIG. 2, FIG. 2 is a schematic flowchart of a wearable device-based information transfer method according to an embodiment of the present disclosure. As shown in FIG. 2, the wearable device-based information transfer method may include the following steps.

Step 201: A first wearable device records a first event parameter corresponding to a social action when detecting that a first user wearing the first wearable device performs the social action, where the first event parameter includes a first event time, a first event site, or an identifier of the first user.

In this embodiment of the present disclosure, the first wearable device (for example, a watch) can collect data on sensors such as a gyroscope and an accelerometer of the first wearable device, and detect, according to the data on the sensors such as the gyroscope and the accelerometer, whether the first user wearing the first wearable device performs a social action (such as a handshake or an embrace). Using a handshake as an example of a social action, the first wearable device can extract signal characteristics from the data on the sensors such as the gyroscope and the accelerometer using a fast-convergence distributed support vector machine (FDSVM) algorithm. For example, signal characteristics of the gyroscope and the accelerometer may be acceleration time-domain variances in three dimensions, namely axes x, y, and z, or the like. Furthermore, after extracting the signal characteristics of the gyroscope and the accelerometer, the first wearable device may use a multi-class support vector machine (SVM) algorithm to identify a handshake action. In actual application, the first wearable device may use another more complex algorithm combination to extract a signal characteristic and identify a handshake action, which is not limited in this embodiment of the present disclosure.

In this embodiment of the present disclosure, the first wearable device may record a first event time corresponding to a social action when detecting that the social action (for example, a handshake) occurs. The first event time may include a first event start time (also referred to as a start time of the social action detected by the first wearable device) and first event duration (also referred to as duration of the social action detected by the first wearable device), where the first event duration is usually in a unit of millisecond (ms).

In this embodiment of the present disclosure, the first wearable device may record a first event site (also referred to as a site at which the first wearable device detects the social action) positioned by a GPS of the first wearable device when detecting that a social action (for example, a handshake) occurs.

In an embodiment, the first wearable device may be connected to an external GPS device such that the external GPS device may push a detected site to the first wearable device in real time. Accordingly, the first wearable device may record a site pushed by the external GPS device, and use the site as a first event site (also referred to as a site at which the first wearable device detects the social action) when detecting that a social action (for example, a handshake) occurs.

Accordingly, in this embodiment of the present disclosure, the first wearable device may store the recorded first event time, first event site, or identifier of the first user as the first event parameter corresponding to the social action, subsequently release the first event parameter, and the like. The identifier of the first user may be a mobile phone number, a social account, or the like of the first user, which is not limited in this embodiment of the present disclosure.

In an embodiment, the first wearable device may store the recorded first event time, first event site, or identifier of the first user, as the first event parameter corresponding to the social action, subsequently release the first event parameter, and the like.

Step 202: The first wearable device obtains a second event parameter released by a second wearable device, where the second event parameter includes a second event time, a second event site, or an identifier of a second user, and the second event parameter is an event parameter recorded by the second wearable device when the second wearable device detects that the second user wearing the second wearable device performs a social action.

In the networking architecture shown in FIG. 1, the second wearable device may accordingly record the second event parameter corresponding to the social action when detecting that the second user wearing the second wearable device performs a social action, where the second event parameter may include the second event time, the second event site, or the identifier of the second user. A manner used by the second wearable device to detect that a social action occurs may be the same as the manner used by the first wearable device to detect that a social action occurs, and is not described again in this embodiment of the present disclosure. The second event time may include a second event start time (also referred to as a start time of the social action detected by the second wearable device) and second event duration (also referred to as duration of the social action detected by the second wearable device), where the second event duration is also usually in the unit of ms. The second wearable device may collect a second event site (also referred to as a site at which the second wearable device detects the social action) positioned by a GPS of the second wearable device when detecting that a social action (for example, a handshake) occurs. In an embodiment, the second wearable device may be connected to an external GPS device such that the external GPS device may push a detected site to the second wearable device in real time. Accordingly, the second wearable device may record a site pushed by the external GPS device, and use the site as a second event site (also referred to as a site at which the second wearable device detects the social action) when detecting that a social action (for example, a handshake) occurs.

Accordingly, the second wearable device may store the recorded second event time, second event site, or identifier of the second user as the second event parameter corresponding to the social action, and release the second event parameter. The identifier of the second user may be a mobile phone number, a social account, or the like of the second user, which is not limited in this embodiment of the present disclosure.

In the networking architecture shown in FIG. 1, neither the first wearable device nor the second wearable device is connected to another smart device such as a mobile phone or a tablet computer. Therefore, after the second wearable device uses the recorded second event time and second event site as the second event parameter corresponding to the social action, the second wearable device may release the second event parameter including the second event time and the second event site using an available network connection capability (for example, NFC) of the second wearable device. Accordingly, the first wearable device may acquire, using an available network connection capability (for example, NFC) of the first wearable device, the second event parameter released by the second wearable device.

Step 203: The first wearable device determines whether the first event parameter matches the second event parameter, and sends first user-defined information to the second wearable device if the first event parameter matches the second event parameter.

In an embodiment, the first event parameter may further include a first social action type (for example, a handshake), and the second event parameter may further include a second social action type (for example, a handshake). Accordingly, after executing step 201 and step 202, the first wearable device may further execute the step of determining, by the first wearable device, whether the first social action type is the same as the second social action type, and then step 203 is executed if the first social action type is the same as the second social action type, and otherwise, step 203 is not executed, where through this step, accuracy of the first user-defined information sent to the second wearable device can be improved.

In this embodiment of the present disclosure, determining, by the first wearable device, whether the first event parameter matches the second event parameter may include determining, by the first wearable device, whether the first event time matches the second event time, and/or determining whether the first event site matches the second event site, and/or determining whether the identifier of the first user matches the identifier of the second user.

In this embodiment of the present disclosure, the first event time may include the first event start time and the first event duration, and the second event time may include the second event start time and the second event duration. Accordingly, a specific implementation manner used by the first wearable device to determine whether the first event time matches the second event time may be that the first wearable device determines whether a difference between the first event start time and the second event start time is less than a first set threshold (for example, 2 seconds (S)). If the difference between the first event start time and the second event start time is less than the first set threshold, the first wearable device may determine whether a difference between the first event duration and the second event duration is less than a second set threshold (for example, 500 ms), and determine that the first event time matches the second event time if the difference between the first event duration and the second event duration is less than the second set threshold.

Accordingly, a specific implementation manner used by the first wearable device to determine whether the first event site matches the second event site may be that the first wearable device may determine whether the first event site is same as the second event site, and determine that the first event site matches the second event site if the first event site is the same as the second event site, or the first wearable device may determine whether a distance between the first event site and the second event site is less than a preset threshold, and determine that the first event site matches the second event site if the distance between the first event site and the second event site is less than the preset threshold.

Accordingly, a specific implementation manner used by the first wearable device to determine whether the identifier of the first user matches the identifier of the second user may be that the first wearable device determines whether the identifier of the first user and the identifier of the second user belong to user identifiers of a same relationship chain, and determines that the identifier of the first user matches the identifier of the second user if the identifier of the first user and the identifier of the second user belong to the user identifiers of the same relationship chain.

Values of the foregoing first set threshold, second set threshold, and preset threshold may be set as required, which are not limited in this embodiment of the present disclosure.

In this embodiment of the present disclosure, it can be determined that the first event time does not match the second event time if the first wearable device determines that the difference between the first event start time and the second event start time is greater than or equal to the first set threshold (for example, 2 s), or if the first wearable device determines that the difference between the first event start time and the second event start time is less than the first set threshold (for example, 2 s), but the first wearable device determines that the difference between the first event duration and the second event duration is greater than or equal to the second set threshold (for example, 500 ms). In this embodiment of the present disclosure, it can be determined that the first event site does not match the second event site if the first wearable device determines that the first event site is not the same as the second event site.

In this embodiment of the present disclosure, it can be determined that a social action such as a handshake occurs between a business person carrying the first wearable device and a business person carrying the second wearable device when the first wearable device determines that the first event time matches the second event time, and determines that the first event site matches the second event site. In this case, the second wearable device is used as a transfer object (or referred to as a service object) of the first wearable device. Accordingly, the first wearable device may send the first user-defined information to the second wearable device. The first user-defined information refers to user-defined information stored in the first wearable device.

In the networking architecture shown in FIG. 1, neither the first wearable device nor the second wearable device is connected to another smart device such as a mobile phone or a tablet computer. Therefore, after the first wearable device determines that the first event time matches the second event time, and determines that the first event site matches the second event site, the first wearable device may send the first user-defined information to the second wearable device using the available network connection capability (for example, NFC) of the first wearable device. Accordingly, the second wearable device may acquire, using the available network connection capability (for example, NFC) of the second wearable device, the first user-defined information sent by the first wearable device.

In this embodiment of the present disclosure, the first wearable device may further perform the following operations when detecting that a social action occurs.

Determining a Network Status:

First, the first wearable device determines an available network connection capability and a network connection status of the first wearable device.

The available network connection capability of the first wearable device may include various available network connection capabilities such as BT, NFC, and WIFI, which is not limited in this embodiment of the present disclosure. The network connection status of the first wearable device may include that the first wearable device is connected to a smart device or that the first wearable device is connected to no smart device.

Second, the first wearable device may release the foregoing first event parameter at a network adaptation layer using multiple available network connection capabilities if the network connection status of the first wearable device is that the first wearable device is not connected to a smart device. In addition to releasing the foregoing first event parameter at a network adaptation layer using multiple available network connection capabilities, the first wearable device may further release the foregoing first event parameter using an available network connection capability of the connected smart terminal if the network connection status of the first wearable device is that the first wearable device is connected to a smart device.

In this embodiment of the present disclosure, the foregoing first event parameter may be released by means of service sharing. A process of releasing a shared service may be as follows:

First, a temporary network address is assigned, for example, an Internet Protocol (IP) address whose prefix is 169.254.xxx.xxx (for example, 169.254.150.84) is assigned, and the address is declared in a network. It is considered that the address may be assigned to the first wearable device if there is no response.

Second, a name (for example, eds-xxx.local) is given to the first wearable device, and the name is declared in the network. It is considered that the name can be given to the first wearable device if there is no response.

Third, a shared service of the first wearable device is enabled, for example, the shared service of the first wearable device is enabled through a Transmission Control Protocol (TCP) port 1010.

Fourth, the shared service is declared in the network using, for example, a broadcast message (for example, a multicast domain name system (mDNS) message). The shared service may include a shared-service type (or referred to as a service type), a name of a wearable device (or referred to as a service name), a first event site (or referred to as a service site, namely a site at which a social action is detected), a first event time (or referred to as a service time, including a first event start time and first event duration), a social action type, a network connection status, and an available network connection capability (such as NFC/BT/WIFI).

A process of discovering a shared service is as follows:

First, a query message is released in a network, to query a shared service of a shared-service type.

Second, a response is made if a shared service of the shared-service type is obtained by means of enquiry.

Determining a Transfer Object (or Referred to as a Service Object):

In this embodiment of the present disclosure, as described above, the second wearable device may use the recorded second event time and second event site as the second event parameter corresponding to the social action to release the second event parameter. The second wearable device may release the second event parameter by means of service sharing. In actual application, there may be multiple shared-service release parties including the second wearable device. Accordingly, the first wearable device needs to determine a transfer object (or referred to as a service object) from the multiple shared-service release parties after the first wearable device discovers shared-services released by multiple shared-service release parties.

The second wearable device is used as an example. The first wearable device may extract, from a shared service released by the second wearable device, a second event parameter included in the shared service, namely a second event time and a second event site. The second event time may include a second event start time (also referred to as a start time of a social action detected by the second wearable device) and second event duration (also referred to as duration of the social action detected by the second wearable device). Further, the first wearable device may determine whether a difference between the first event start time and the second event start time is less than a first set threshold (for example, 2 s). If the difference between the first event start time and the second event start time is less than the first set threshold, the first wearable device may determine whether a difference between the first event duration and the second event duration time is less than a second set threshold (for example, 500 ms), and determine that the first event time matches the second event time if the difference between the first event duration and the second event duration is less than the second set threshold. In addition, the first wearable device may determine whether the first event site (also referred to as a site at which the first wearable device detects a social action) is the same as the second event site (also referred to as a site at which the second wearable device detects a social action), and determine that the first event site matches the second event site if the first event site is the same as the second event site. Values of the foregoing first set threshold and second set threshold may be set as required, which are not limited in this embodiment of the present disclosure.

In this embodiment of the present disclosure, it can be determined that a social action such as a handshake occurs between a business person carrying the first wearable device and a business person carrying the second wearable device when the first wearable device determines that the first event time matches the second event time, and determines that the first event site matches the second event site. In this case, the second wearable device is used as a transfer object (or referred to as a service object) of the first wearable device. Accordingly, the first wearable device may send the first user-defined information to the second wearable device. The first user-defined information refers to user-defined information stored in the first wearable device.

In this embodiment of the present disclosure, the first wearable device and the second wearable device may store user-defined information, where user-defined information stored in the first wearable device may be referred to as the first user-defined information, and user-defined information stored in the second wearable device may be referred to as second user-defined information. In actual application, a form of the user-defined information may be shown in Table 1.

TABLE 1

| User-defined information | | | | | |
|---|---|---|---|---|---|
| Personal information | Permission Y/N | Third-party service information entrance | Permission Y/N | Identifier information of a sign detection device | Permission Y/N |
| Name: Zhang San Gender: male | | LINKEDIN Personal blog | | Heart rate detection band Electroencephalogram-based attention detection glasses | |
| Title: CEO of XX Company | | Brief introduction of microblog | | Surface electromyography (SEMG) muscle status detection armband | |
| Email: *@.com . . . | | . . . | | . . . | |

As shown in Table 1, the user-defined information not only may include the personal information, but also may include the third-party service information entrance and the identifier information of the sign detection device. The user-defined information may further include identifiers indicating whether the personal information, the third-party service information entrance, and the identifier information of the sign detection device are authorized. For example, Y indicates being authorized, and N indicates being unauthorized. In actual application, the sign detection device may be a wearable device such as the heart rate detection band, the electroencephalogram-based attention detection glasses, or the SEMG muscle status detection armband, or the sign detection device may be a built-in sign sensor of a wearable device, which is not limited in this embodiment of the present disclosure. In actual application, a user may add, delete, modify, authorize, or deauthorize a type in Table 1 by himself or herself.

In this embodiment of the present disclosure, the foregoing third-party service information entrance in Table 1 may be used to acquire third-party service information, for example, personal blogs, brief introduction of microblog, local weather information, local temperature information, local scenic spots, local catering places, and local hotels.

In this embodiment of the present disclosure, the foregoing status information of the sign detection device in Table 1 is mainly used to acquire user sign data synchronization information. User sign data may include a heart rate, electroencephalogram-based attention, blood oxygen, and the like, which is not limited in this embodiment of the present disclosure.

In this embodiment of the present disclosure, the first wearable device and the second wearable device may further store user-defined rules, where a user-defined rule stored in the first wearable device may be referred to as a first user-defined rule, and a user-defined rule stored in the second wearable device may be referred to as a second user-defined rule. In actual application, a form of the user-defined rule may be shown in Table 2.

TABLE 2

| User-defined rule | | | |
|---|---|---|---|
| Identifier information of a third-party search engine | Permission Y/N | Identifier information of an IOT device | Permission Y/N |
| BAIDU GOOGLE | | Coffeemaker (on, off) Air conditioner (on, off, temperature adjustment) | |

TABLE 2-continued

| User-defined rule | | | |
|---|---|---|---|
| Identifier information of a third-party search engine | Permission Y/N | Identifier information of an IOT device | Permission Y/N |
| BING . . . | | Projector (on, off) Living room lighting (on, off, brightness) IOT device in a visitor mode (for example, a coffeemaker is on, air conditioner temperature is decreased by one degree, living room lighting becomes brighter, and a curtain is drawn) . . . | |

As shown in Table 2, the user-defined rule not only may include the identifier information of the third-party retrieval engine, but also may include the identifier information of the IOT device. As shown in Table 2, the user-defined rule may further include identifiers indicating whether the identifier information of the third-party retrieval engine and the identifier information of the IOT device are authorized. For example, Y indicates being authorized, and N indicates being unauthorized. In actual application, a user may add, delete, modify, authorize, or deauthorize a type in Table 2 by himself or herself.

In this embodiment of the present disclosure, the foregoing identifier information of the third-party search engine in Table 2 may be used to acquire background information of a transfer object. In actual application, a keyword may be extracted from personal information included in user-defined information (for example, the second user-defined information) sent by a transfer object (for example, the second wearable device), and based on the extracted keyword, user background information is searched for using the foregoing authorized third-party search engine in Table 2. In this embodiment of the present disclosure, a service manner of the IOT device may be set by a user. For example, after it is detected that a social action such as a handshake occurs, a coffeemaker is started to make coffee, air conditioner temperature is decreased by one degree, and the like.

In this embodiment of the present disclosure, when detecting that a social action occurs, the first wearable device may further execute the following step first, that is detecting, by the first wearable device, whether a social statement occurs, and executing the step of acquiring a second event parameter released by a second wearable device if a social statement occurs.

Detecting whether a social statement occurs may include detecting whether some common social statements such as "Hello" and "Long time no see" occur. If it is detected that some common social statements such as "Hello" and "Long time no see" occur, the step of acquiring a second event parameter released by a second wearable device is then executed, which can improve accuracy of the acquired second event parameter released by the second wearable device.

Based on the networking architecture shown in FIG. 1, according to the information transfer method described in FIG. 2, troublesome manual operations performed during transfer of information including an electronic contact card can be omitted, which can effectively improve information transfer efficiency. In addition, according to the information transfer method described in FIG. 2, information can be efficiently transferred without a manual operation performed by a user for selecting a transfer object and information and without the user, which can improve user experience in a business environment.

Figure 3:
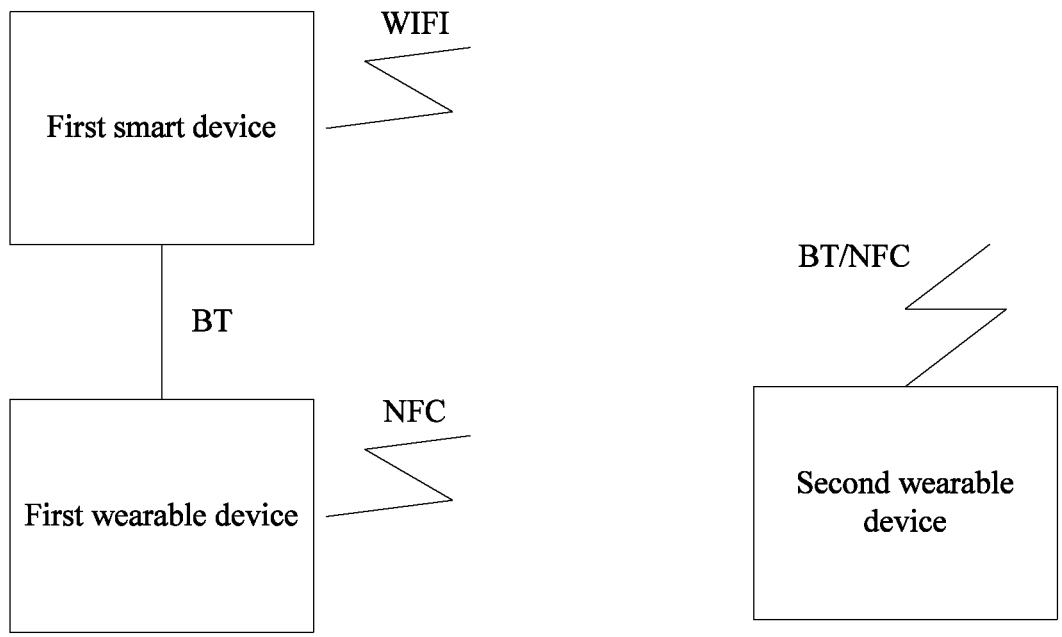
FIG. 3 is a schematic diagram of a second networking architecture according to an embodiment of the present disclosure.

Referring to FIG. 3, FIG. 3 is a schematic diagram of a second networking architecture according to an embodiment of the present disclosure. As shown in FIG. 3, the networking architecture may include a first wearable device, a second wearable device, and a first smart device. The first wearable device is connected to the first smart device, and the second wearable device is not connected to a smart device. In the networking architecture shown in FIG. 3, manners used by the first wearable device and the second wearable device to detect occurrence of a social action have been described in the foregoing embodiment, and are not described herein again.

In the networking architecture shown in FIG. 3, available network connection capability of the first wearable device may include one or more of BT, NFC, WIFI, and ZIGBEE. The first wearable device may be connected to the first smart device by means of BT. Using another available network connection capability than BT, at a network adaptation layer, the first wearable device may release a shared service (including a first event parameter), and discover a shared service (including a second event parameter) released by the second wearable device. Processes of releasing, by the first wearable device, a shared service (including the first event parameter) and discovering a shared service (including the second event parameter) released by the second wearable device are as described in the foregoing embodiment, and are not described herein again. When the first wearable device discovers, at the network adaptation layer using another available network connection capability other than BT, the shared service (including the second event parameter) released by the second wearable device, it can be implemented that the second event parameter released by the second wearable device is acquired at the network adaptation layer using the other available network connection capability than BT.

The first smart device may receive a shared-service broadcast request pushed by the first wearable device by means of BT, and detect that an available network connection capability of the first smart device may include WIFI, BT, and the like. The first smart device may broadcast, as an agent, a shared-service request (including a shared service) at the network adaptation layer using the available network connection capability (for example, WIFI) of the first smart device. Therefore, it can be implemented that the first wearable device releases the first event parameter using an available network connection capability of the first smart device.

The second wearable device is in a network connection state in which smart device is not connected. An available network connection capability of the second wearable device may include one or more of BT, NFC, WIFI, and ZIGBEE. In this case, using one or more available network connection capabilities, at the network adaptation layer, the second wearable device may release a shared service (including the second event parameter), and release a shared service (including the first event parameter) released by the first wearable device. Processes of releasing, by the second wearable device, a shared service (including the second event parameter) and discovering a shared service (including the first event parameter) released by the first wearable device are as described in the foregoing embodiment, and are not described herein again. When the second wearable device discovers, at the network adaptation layer using the one or more available network connection capabilities, the shared service (including the first event parameter) released by the first wearable device, it can be implemented that the first event parameter released by the first wearable device is acquired at the network adaptation layer using the one or more available network connection capabilities.

In the networking architecture shown in FIG. 3, the first wearable device may broadcast a shared service using the first smart device as an agent, while the second wearable device itself may broadcast a shared service. The first wearable device may exchange user-defined information with the second wearable device through the first smart device after determining a transfer object, where a form of the user-defined information is shown in the foregoing embodiment, and is not described herein again.

Figure 4:
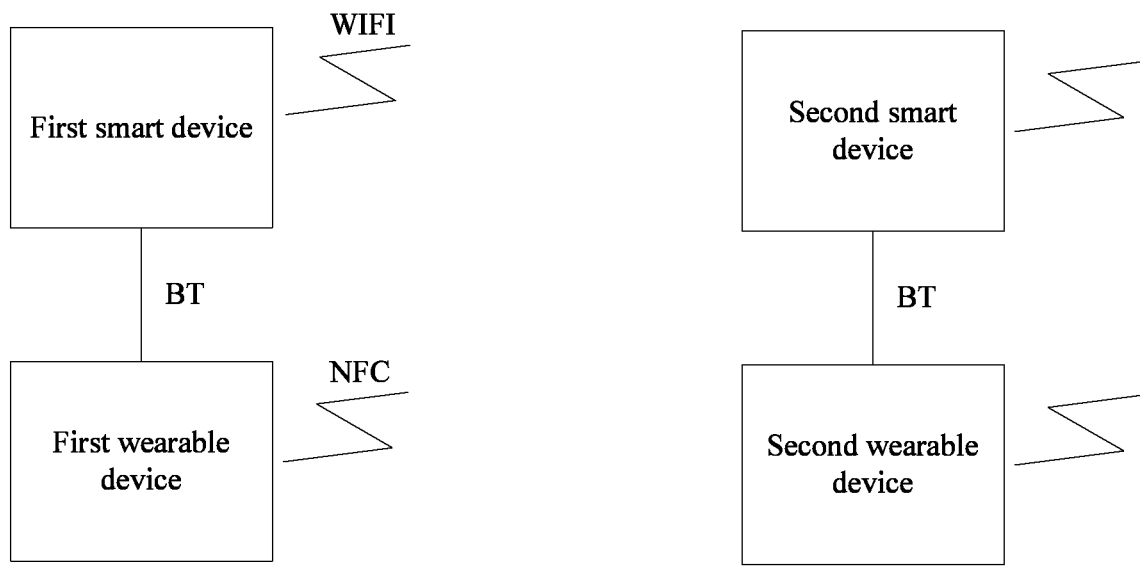
FIG. 4 is a schematic diagram of a third networking architecture according to an embodiment of the present disclosure.

Referring to FIG. 4, FIG. 4 is a schematic diagram of a third networking architecture according to an embodiment of the present disclosure. As shown in FIG. 4, the networking architecture may include a first wearable device, a first smart device, a second wearable device, and a second smart device. The first wearable device is connected to the first smart device, and the second wearable device is connected to the second smart device. In the networking architecture shown in FIG. 4, manners used by the first wearable device and the second wearable device to detect occurrence of a social action have been described in the foregoing embodiment, and are not described herein again.

In the networking architecture shown in FIG. 4, available network connection capability of the first wearable device may include one or more of BT, NFC, WIFI, and ZIGBEE. The first wearable device may be connected to the first smart device by means of BT. Using another available network connection capability than BT, at a network adaptation layer, the first wearable device may release a shared service (including a first event parameter), and discover a shared service (including a second event parameter) released by the second wearable device. Processes of releasing, by the first wearable device, a shared service (including the first event parameter) and discovering a shared service (including the second event parameter) released by the second wearable device are as described in the foregoing embodiment, and are not described herein again. When the first wearable device discovers, at the network adaptation layer using another available network connection capability other than BT, the shared service (including the second event parameter) released by the second wearable device, it can be implemented that the second event parameter released by the second wearable device is acquired at the network adaptation layer using the other available network connection capability than BT.

Available network connection capability of the second wearable device may include one or more of BT, NFC, WIFI, and ZIGBEE. The second wearable device may be connected to the second smart device by means of BT. Using another available network connection capability other than BT, at the network adaptation layer, the second wearable device may release a shared service (including the second event parameter), and discover a shared service (including the first event parameter) released by the first wearable device. Processes of releasing, by the second wearable device, a shared service (including the second event parameter) and discovering a shared service (including the first event parameter) released by the first wearable device are as described in the foregoing embodiment, and are not described herein again. When the second wearable device discovers, at the network adaptation layer using another available network connection capability other than BT, the shared service (including the first event parameter) released by the first wearable device, it can be implemented that the first event parameter released by the first wearable device is acquired at the network adaptation layer using the other available network connection capability than BT.

The first smart device may receive a shared-service broadcast request pushed by the first wearable device by means of BT, and detect that an available network connection capability of the first smart device may include WIFI, BT, and the like. The first smart device may broadcast, as an agent, a shared-service request (including a shared service) at the network adaptation layer using the available network connection capability (for example, WIFI) of the first smart device. Therefore, it can be implemented that the first wearable device releases the first event parameter using an available network connection capability of the first smart device.

The second smart device may receive a shared-service broadcast request pushed by the second wearable device by means of BT, and detect that an available network connection capability of the second smart device may include WIFI, BT, and the like. The second smart device may broadcast, as an agent, a shared-service request (including a shared service) at the network adaptation layer using the available network connection capability (for example, WIFI) of the second smart device. Therefore, it can be implemented that the second wearable device releases the second event parameter using an available network connection capability of the second smart device.

In the networking architecture shown in FIG. 4, the first wearable device may broadcast a shared service using the first smart device as an agent, and the second wearable device may broadcast a shared service using the second smart device as an agent. The first wearable device may send first user-defined information to the second wearable device using another available network connection capability than BT, and the second wearable device may send second user-defined information to the first wearable device using another available network connection capability than BT after determining a transfer object. Further, the first wearable device may send the first user-defined information to the second smart device using an available network connection capability of the first smart device, to trigger the second smart device to send the first user-defined information to the second wearable device. The second wearable device may send the second user-defined information to the first smart device using an available network connection capability of the second smart device, to trigger the first smart device to send the second user-defined information to the first wearable device. That is, the first smart device and the second smart device may act as wearable devices to complete exchange of user-defined information. Forms of the first user-defined information and the second user-defined information are shown in the foregoing embodiment, and are not described herein again.

Figure 5:
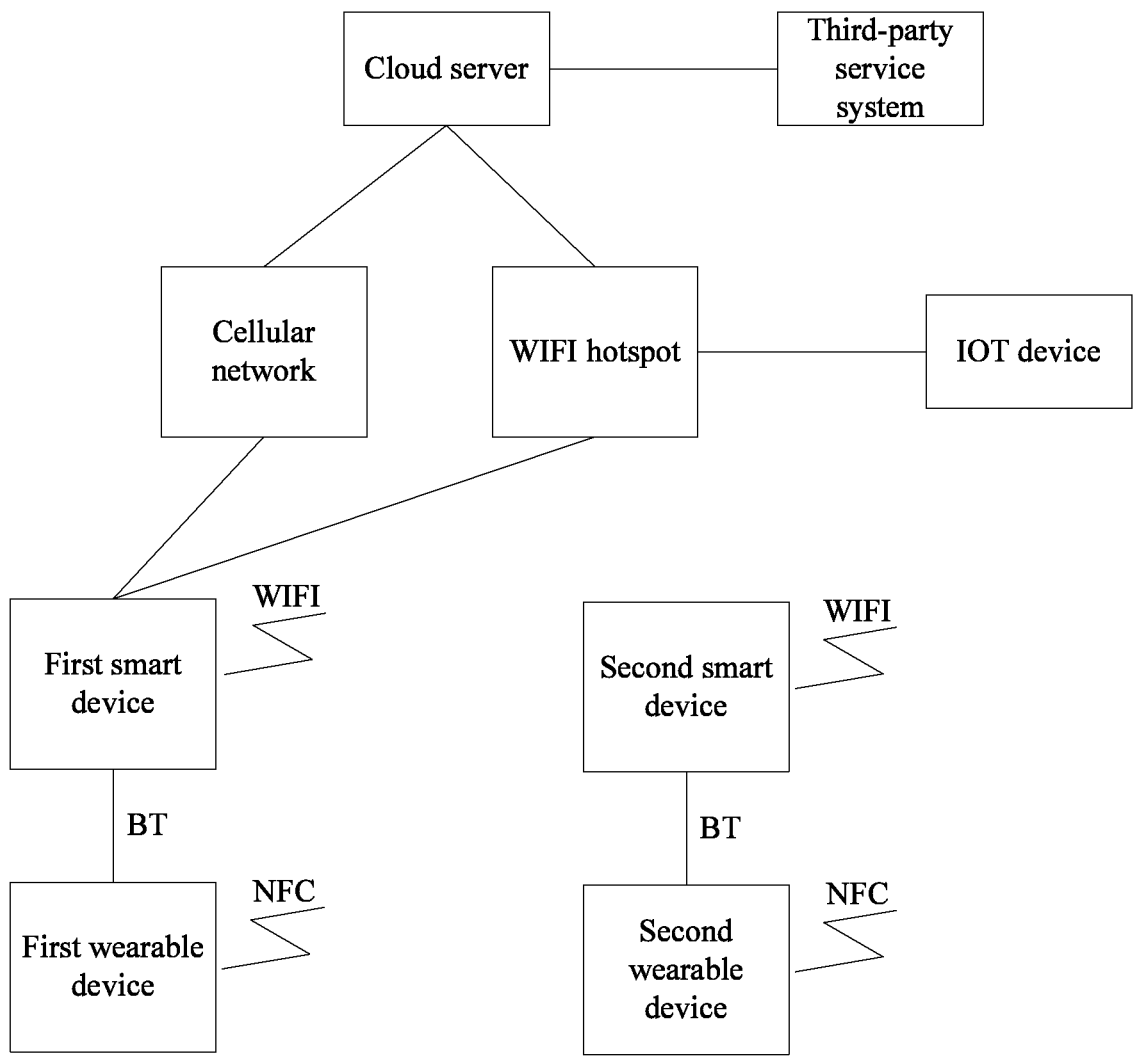
FIG. 5 is a schematic diagram of a fourth networking architecture according to an embodiment of the present disclosure.

Referring to FIG. 5, FIG. 5 is a schematic diagram of a fourth networking architecture according to an embodiment of the present disclosure. In the networking architecture shown in FIG. 5, a first smart device is connected to a first wearable device, and the first smart device is connected to a cloud server through a WIFI hotspot (for example, a WIFI router) or a cellular network. The cloud server is further connected to a third-party service system, and an IOT device is connected to the foregoing WIFI hotspot, where the WIFI hotspot may support standard protocols such as Institute of Electrical and Electronics Engineers (IEEE) 802.11a/b/n/c. A second wearable device and a second smart device have only a local BT connection. In the networking architecture shown in FIG. 5, manners used by the first wearable device and the second wearable device to detect occurrence of a social action have been described in the foregoing embodiment, and are not described herein again.

After the first wearable device and a second terminal device exchange user-defined information, if the first smart device and the second smart device are still in an online state, the first wearable device and the second wearable device may perform status registration with the cloud server respectively through the first smart device connected to the first wearable device and the second smart device connected to the second wearable device. That is, the first wearable device may report a status of a networking connection between the first smart device and the first wearable device, second user-defined information, and a first user-defined rule to the cloud server through the first smart device, and the second wearable device may report a status of a networking connection between the second smart device and the second wearable device, first user-defined information, and a second user-defined rule to the cloud server through the second smart device. The cloud server maintains registered statuses of the first wearable device and the second wearable device, and identifies that two groups of interactive objects (that is, the first wearable device and the second wearable device) are in a "connected" state.

In this embodiment of the present disclosure, the cloud server may extract a keyword (for example, "CEO of xx Company" in Table 1) from personal information included in the second user-defined information that is reported by the first wearable device through the first smart device, and obtain, by means of searching through an authorized third-party search engine (for example, Google) included in the first user-defined rule that is reported by the first wearable device through the first smart device, second user background information matched with the keyword. Further, the cloud server may send the obtained second user background information to the first wearable device through the first smart device, thereby implementing that the first wearable device can acquire, through the first smart device, the second user background information sent by the cloud server.

In this embodiment of the present disclosure, the cloud server may extract a keyword (for example, "Zhang San" in Table 1) from personal information included in the first user-defined information that is reported by the second wearable device through the second smart device, and obtain, by means of searching through an authorized third-party search engine (for example, GOOGLE) included in the second user-defined rule that is reported by the second wearable device through the second smart device, first user background information matched with the keyword. Further, the cloud server may send the obtained first user background information to the second wearable device through the second smart device, thereby implementing that the second wearable device can acquire, through the second smart device, the first user background information sent by the cloud server.

In this embodiment of the present disclosure, the cloud server may acquire, through a third-party service information entrance included in the second user-defined information that is reported by the first wearable device through the first smart device, third-party service information (such as weather information and temperature information) from the third-party service system. Further, the cloud server may send the obtained third-party service information (such as weather information and temperature information) to the first wearable device through the first smart device, thereby implementing that the first wearable device can acquire, through the first smart device, the third-party service information (such as weather information and temperature information) sent by the cloud server.

In this embodiment of the present disclosure, the cloud server may acquire, through a third-party service information entrance included in the first user-defined information that is reported by the second wearable device through the second smart device, third-party service information (such as weather information and temperature information) from the third-party service system. Further, the cloud server may send the obtained third-party service information (such as weather information and temperature information) to the second wearable device through the second smart device, thereby implementing that the second wearable device can acquire, through the second smart device, the third-party service information (such as weather information and temperature information) sent by the cloud server.

In the network architecture shown in FIG. 5, because the first smart terminal and the IOT device may be connected to a same WIFI hotspot, the first smart device may perform IOT device identification in a WIFI-based network. Accordingly, after the first wearable device determines that a first event time matches a second event time, and that a first event site matches a second event site, the first wearable device may send the first user-defined rule to the first smart device such that the first smart device may trigger, according to the first user-defined rule, an authorized IOT device to provide a service, where reference may be made to Table 2 described above for the authorized IOT device that can be triggered and a service type of the authorized IOT device. In actual application, a user may set by himself or herself or may provide a more fractionized first user-defined regulation, for example, a specific IOT device that is in a visitor mode and that correspond to both a site at which a social action occurs and an outdoor temperature existing when a social event happens may be triggered to provide a service.

Further, based on the foregoing user-defined information (refer to Table 1 for specific content), the user may add a personal preference by himself or herself. For example, a user relatively likes drinking tea, and does not like coffee. In this case, when triggering an IOT device to provide a service, a smart device may trigger, comprehensively according to a user-defined rule and a user's preference, an IOT tea device to provide a service, instead of triggering a coffeemaker device to provide a service.

Figure 6:
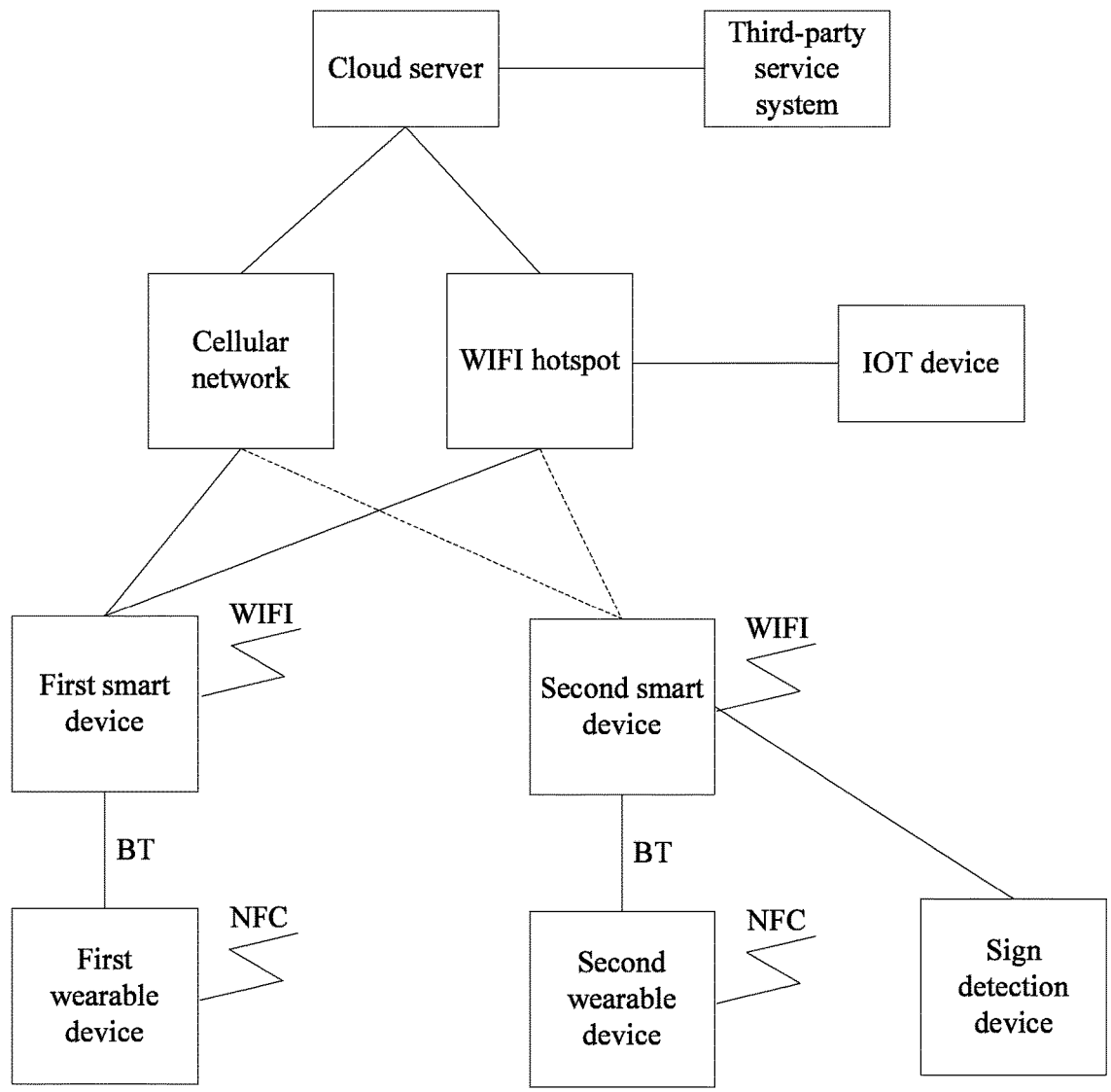
FIG. 6 is a schematic diagram of a fifth networking architecture according to an embodiment of the present disclosure.

Referring to FIG. 6, FIG. 6 is a schematic diagram of a fifth networking architecture according to an embodiment of the present disclosure. In the networking architecture shown in FIG. 6, a first smart device is connected to a first wearable device, and the first smart device is connected to a cloud server through a WIFI hotspot (for example, a WIFI router) or a cellular network. The cloud server is further connected to a third-party service system, and an IOT device is connected to the foregoing WIFI hotspot, where the WIFI hotspot may support standard protocols such as IEEE 802.11a/b/n/c. A second smart device is connected to a second wearable device, and the second smart device is connected to the cloud server through a WIFI hotspot (for example, a WIFI router) or a cellular network, where the second smart device and a physical examination detection device may be connected to a same WIFI hotspot. In actual application, the sign detection device may be a wearable device. In the networking architecture shown in FIG. 6, manners used by the first wearable device and the second wearable device to detect occurrence of a social action have been described in the foregoing embodiment, and are not described herein again.

Compared with the networking architecture shown in FIG. 5, in the networking architecture shown in FIG. 6 the second smart device may keep a communication connection with the sign detection device, and the sign detection device may send detected second user sign data synchronization information to the cloud server through the second smart device. Further, the cloud server may extract identifier information of the authorized sign detection device from second user-defined information that is reported by the first wearable device through the first smart device, acquire the second user sign data synchronization information (for example, a heart rate) reported by the authorized sign detection device, and send the acquired second user sign data synchronization information to the first wearable device through the first smart device, thereby implementing that the first wearable device acquires, through the first smart device, the second user sign data synchronization information sent by the cloud server.

Further, in the networking architecture shown in FIG. 6, the cloud server may synchronize the second user sign data synchronization information of one side of the second wearable device to the first wearable device. According to the second user sign data synchronization information, the first smart device may trigger a corresponding IOT device to provide a service. For example, the first smart device may trigger an IOT sound box to play soothing music if it is discovered according to the second user sign data synchronization information that a second user is relatively nervous.

In the networking architecture shown in FIG. 6, there may be the following several cases for the second user sign data synchronization information obtained by the first wearable device.

1: After the second smart terminal performs data processing on the second user sign data synchronization information, the second user sign data synchronization information is pushed to the first smart terminal through the cloud server.

2: After the cloud server performs big data processing on the second user sign data synchronization information, the second user sign data synchronization information is pushed to the first smart terminal.

3: The second user sign data synchronization information is pushed and displayed after being sent to the first smart terminal for data processing.

Data processing may include analog-to-digital conversion, digital-and-graphic conversation, and the like, which is not limited in this embodiment of the present disclosure.

Figure 7:
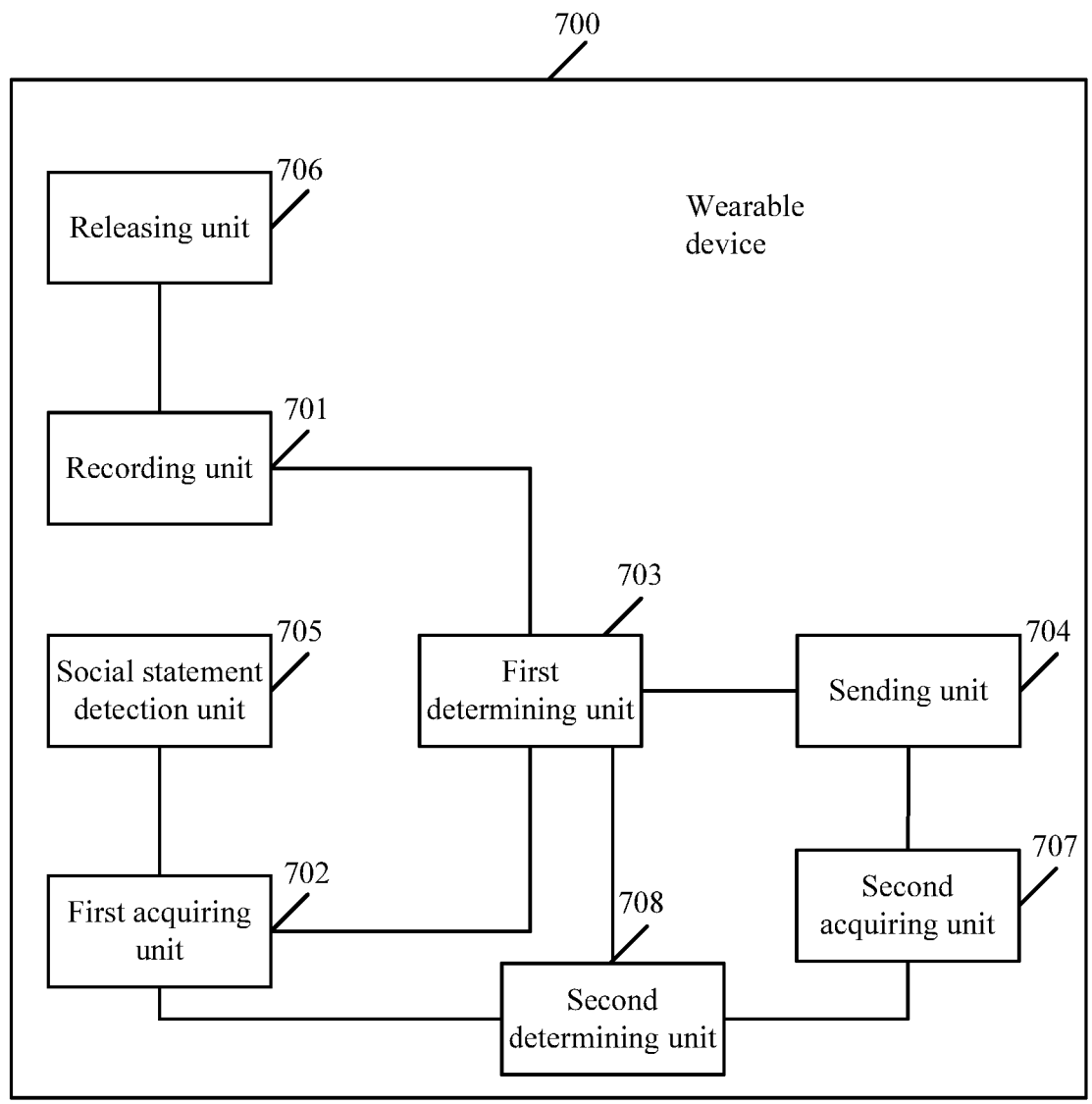
FIG. 7 is a schematic structural diagram of a wearable device according to an embodiment of the present disclosure.

The foregoing describes the networking architecture and the information transfer method that are disclosed in the embodiments of the present disclosure. The following further describes in detail a wearable device disclosed in the embodiments of the present disclosure. Referring to FIG. 7, FIG. 7 is a schematic structural diagram of a wearable device according to an embodiment of the present disclosure. As shown in FIG. 7, the wearable device 700 may include a recording unit 701 configured to record a first event parameter corresponding to a social action when it is detected that a first user wearing the wearable device 700 performs the social action, where the first event parameter includes a first event time, a first event site, or an identifier of the first user, a first acquiring unit 702 configured to obtain a second event parameter released by a second wearable device, where the second event parameter includes a second event time, a second event site, or an identifier of a second user, and the second event parameter is an event parameter recorded by the second wearable device when the second wearable device detects that the second user wearing the second wearable device performs a social action, a first determining unit 703 configured to determine whether the first event parameter matches the second event parameter, and a sending unit 704 configured to send first user-defined information to the second wearable device when a determining result of the first determining unit 703 is that the first event parameter matches the second event parameter.

In this embodiment of the present disclosure, the first determining unit 703 may be configured to determine whether the first event time matches the second event time, and/or may be configured to determine whether the first event site matches the second event site, and/or may be configured to determine whether the identifier of the first user matches the identifier of the second user.

In this embodiment of the present disclosure, the first event time includes a first event start time and first event duration, and the second event time includes a second event start time and second event duration, and the first determining unit 703 determines whether the first event time matches the second event time includes that the first determining unit 703 determines whether a difference between the first event start time and the second event start time is less than a first set threshold, the first wearable device determines whether a difference between the first event duration and the second event duration is less than a second set threshold if the difference between the first event start time and the second event start time is less than the first set threshold, and determines that the first event time matches the second event time if the difference between the first event duration and the second event duration is less than the second set threshold.

That the first determining unit 703 determines whether the first event site matches the second event site includes that the first determining unit 703 determines whether the first event site is the same as the second event site, and determines that the first event site matches the second event site if the first event site is the same as the second event site, or the first determining unit 703 determines whether a distance between the first event site and the second event site is less than a preset threshold, and determines that the first event site matches the second event site if the distance between the first event site and the second event site is less than the preset threshold.

That the first determining unit 703 determines whether the identifier of the first user matches the identifier of the second user includes that the first determining unit 703 determines whether the identifier of the first user and the identifier of the second user belong to user identifiers of a same relationship chain, and determines that the identifier of the first user matches the identifier of the second user if the identifier of the first user and the identifier of the second user belong to the user identifiers of the same relationship chain.

In an embodiment, the wearable device 700 shown in FIG. 7 may further include a social statement detection unit 705 configured to detect whether a social statement occurs when it is detected that the first user wearing the wearable device 700 performs a social action, and trigger the first acquiring unit 702 to execute the operation of obtaining a second event parameter released by a second wearable device if a social statement occurs.

In an embodiment, the first acquiring unit 702 is configured to obtain, using an available network connection capability of the wearable device 700, the second event parameter released by the second wearable device, and/or the first acquiring unit 702 is configured to obtain, using an available network connection capability of a first smart device, the second event parameter released by the second wearable device, where the wearable device 700 keeps a communication connection with the first smart device.

A manner used by the sending unit 704 to send the first user-defined information to the second wearable device includes that the sending unit 704 is configured to send the first user-defined information to the second wearable device using the available network connection capability of the wearable device 700, and/or configured to send the first user-defined information to the second wearable device using the available network connection capability of the first smart device.

In an embodiment, the wearable device 700 shown in FIG. 7 may further include a releasing unit 706 configured to release, using the available network connection capability of the wearable device 700, the first event parameter recorded by the recording unit 701, and/or configured to release, using the available network connection capability of the first smart device, the first event parameter recorded by the recording unit 701.

In an embodiment, the wearable device 700 shown in FIG. 7 may further include a second acquiring unit 707 configured to acquire, using the available network connection capability of the wearable device 700, second user-defined information sent by the second wearable device, and/or configured to acquire, using the available network connection capability of the first smart device, second user-defined information sent by the second wearable device, where the second user-defined information is sent to the wearable device 700 by the second wearable device after the second wearable device acquires the first event parameter and determines that the first event time matches the second event time and that the first event site matches the second event site.

In an embodiment, the first event parameter further includes a first social action type (for example, a handshake), and the second event parameter may further include a second social action type (for example, a handshake). Accordingly, the wearable device 700 may further include a second determining unit 708 configured to determine whether the first social action type is the same as the second social action type, and trigger the first determining unit 703 to execute the foregoing operation of determining whether the first event parameter matches the second event parameter if the first social action type is the same as the second social action type.

In an embodiment, the sending unit 704 is further configured to send a first user-defined rule to the first smart device such that the first smart device triggers, according to the first user-defined rule, an authorized IOT device to provide a service after the first determining unit 703 determines whether the first event parameter matches the second event parameter, where the first user-defined rule includes identifier information of at least one authorized IOT device.

In an embodiment, the first user-defined rule further includes identifier information of at least one authorized third-party search engine, and the second user-defined information acquired by the second acquiring unit 707 includes personal information.

The sending unit 704 is further configured to send the second user-defined information and the first user-defined rule to a cloud server through the first smart device.

The second acquiring unit 707 is further configured to acquire, through the first smart device, second user background information sent by the cloud server, where the second user background information is second user background information that is obtained by the cloud server through the authorized third-party search engine after the cloud server extracts a keyword from the personal information included in the second user-defined information and that matches the keyword.

In an embodiment, the second user-defined information acquired by the second acquiring unit 707 further includes an authorized third-party service information entrance.

The second acquiring unit 707 is further configured to acquire, through the first smart device, third-party service information sent by the cloud server, where the third-party service information is third-party service information that is acquired from a third-party service system by the cloud server through the third-party service information entrance.

In an embodiment, the second user-defined information acquired by the second acquiring unit 707 further includes identifier information of an authorized sign detection device.

The second acquiring unit 707 is further configured to acquire, through the first smart device, second user sign data synchronization information sent by the cloud server, where the second user sign data synchronization information is sent to the cloud server by the authorized sign detection device through a second smart device, and the second wearable device keeps a communication connection with the second smart device.

In an embodiment, the first event time includes a first event start time (that is, a start time of a social action detected by the wearable device 700) and first event duration (that is, duration of the social action detected by the wearable device 700), and the second event time includes a second event start time (that is, a start time of a social action detected by the second wearable device) and second event duration (that is, duration of the social action detected by the second wearable device). Accordingly, the first determining unit 703 is configured to determine whether a difference between the first event start time and the second event start time is less than a first set threshold (for example, 2 s), if the difference between the first event start time and the second event start time is less than the first set threshold, determine whether a difference between the first event duration and the second event duration is less than a second set threshold (for example, 500 ms), determine that the first event time matches the second event time if the difference between the first event duration and the second event duration is less than the second set threshold, determine whether the first event site is the same as the second event site, and determine that the first event site matches the second event site if the first event site is the same as the second event site.

In this embodiment of the present disclosure, the first user-defined information and the second user-defined information may be shown in Table 1 described above, and may include personal information, an authorized third-party service information entrance, and status information of an authorized sign detection device, which are not limited in this embodiment of the present disclosure.

In this embodiment of the present disclosure, according to the wearable device shown in FIG. 7, troublesome manual operations performed during transfer of information including an electronic contact card can be omitted, which can effectively improve information transfer efficiency. In addition, according to the wearable device shown in FIG. 7, information can be efficiently transferred without a manual operation performed by a user for selecting a transfer object and information and without the user, which can improve user experience in a business environment.

Figure 8:
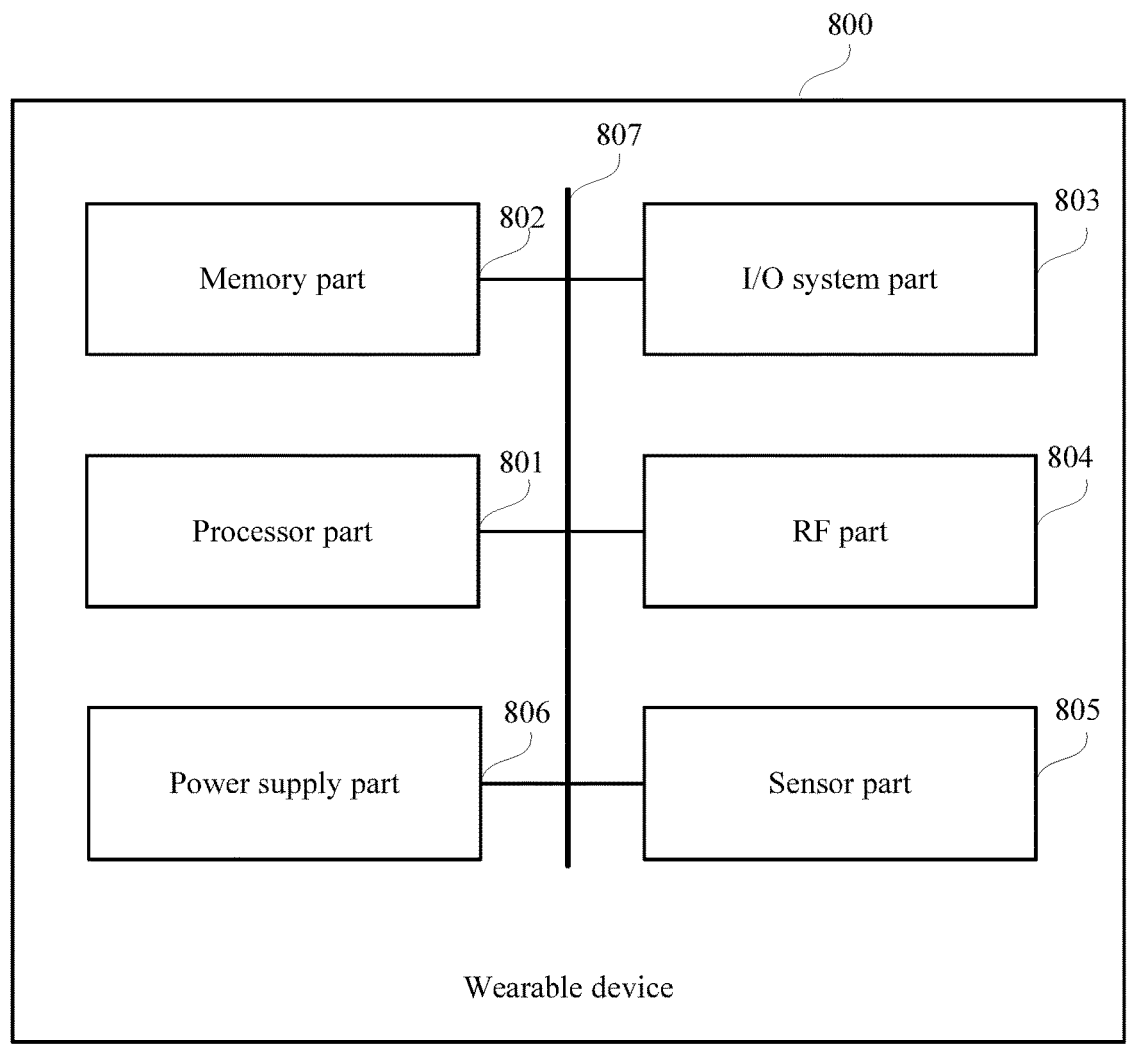
FIG. 8 is a schematic structural diagram of another wearable device according to an embodiment of the present disclosure.

Referring to FIG. 8, FIG. 8 is a schematic structural diagram of another wearable device according to an embodiment of the present disclosure. As shown in FIG. 8, the wearable device 800 may include components such as a processor part 801, a memory part 802, an I/O system part 803, a radio frequency (RF) part 804, a sensor part 805, and a power supply part 806. Furthermore, the processor part 801 may be a central processing unit (CPU). These components communicate with each other through one or more buses 807. A person skilled in the art may understand that a structure of the wearable device shown in FIG. 8 imposes no limitation on the present disclosure. The wearable device 800 may be of a bus-shaped structure or a star-shaped structure, and may further include more or less parts than those shown in FIG. 8. In this embodiment of the present disclosure, the wearable device 800 may be but not limited to smart wearable devices such as a watch, a band, a wrist strap, glasses, a necklace, a finger ring, and earrings.

In this embodiment of the present disclosure, the I/O system part 803 is configured to implement interaction between a user and the wearable device 800, in other words, input information to the wearable device 800 and configured to output information in the wearable device 800. In actual application, the I/O system part 803 may include an input unit and an output unit. The input unit may receive digital or character information entered by a user in order to generate signal input related to user settings or function control. In a specific implementation manner of the present disclosure, the input unit may be a touch panel, may be another human-computer interaction interface, for example, an entity input key or a microphone, or may be another external information capture apparatus, for example, a camera. The touch panel, also referred to as a touchscreen, may collect a touch operation or an approximated operation on the touch panel, for example, an operation action performed by a user with any proper object or accessory such as a finger or stylus in a position on or near the touch panel, and drive a corresponding connection apparatus according to a preset program. Optionally, the touch panel may include two parts, a touch detection apparatus and a touch controller. The touch detection apparatus detects a touch operation of a user, converts the detected touch operation into an electrical signal, and transfers the electrical signal to the touch controller. The touch controller receives the electrical signal from the touch detection apparatus, converts the electrical signal into contact coordinates, and then sends the contact coordinates to the processor part 801. The touch controller may further receive and execute a command sent by the processor part 801. In addition, a touch panel may be implemented using multiple types such as resistance, capacitance, infrared, and surface acoustic-wave. In another implementation manner of the present disclosure, an entity input key used as the input unit may include but is not limited to one or more of a physical keyboard, a functional key (such as a volume control button or a switch button), a trackball, a joystick, and the like. An input unit in a microphone form may collect a voice input from a user or an environment, and convert the collected voice into a command that is in a form of an electrical signal and that can be executed by the processor part 801.

The output unit may include but is not limited to an image output unit, an audio output unit, and a tactility output unit. The image output unit is configured to output text, an image, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display or a display using a technology of interferometric modulation of light. The image output unit may include a single display or multiple displays of different dimensions. In a specific implementation manner of the present disclosure, the touch panel used as the foregoing input unit may be used as the display panel of the output unit. For example, after detecting a touch operation or an approximated gesture operation on the touch panel, the touch panel transfers the operation to the processor part 801, to determine a type of a touch event. After that, the processor part 801 provides corresponding visual output on the display panel according to the type of the touch event. In some embodiments, the touch panel and the display panel may be integrated as a whole, to implement input and output functions of the wearable device. For example, the image output unit may display various graphical user interfaces (GUI) as virtual control components, including but not limited to a window, a scrollbar, an icon, and a scrapbook, for a user to perform an operation by means of touch.

In a specific implementation manner of the present disclosure, the image output unit includes a filter and an amplifier, for performing filtering on and zooming in a video output by the processor part 801. The audio output unit includes a digital-to-analog converter, for converting an audio signal, output by the processor part 801, from a digital format to an analog format.

The processor part 801 is a control center of the wearable device 800, and connected to each part of the entire wearable device using various interfaces and lines, and executes various functions of the wearable device and/or processes data by running or executing a software program and/or module stored in the memory part 802 and invoking data stored in the memory part 802. The processor part 801 may include an integrated circuit (IC), for example, may include a single encapsulated IC, or may include multiple connected encapsulated ICs that have same or different functions. For example, the processor part 801 may include only a CPU, or may be a combination of processors such as a CPU, a digital signal processor (DSP), and a graphic processor unit (GPU). In an implementation manner of the present disclosure, the processor part 801 may include a single computing core, or may include multiple computing cores.

The RF part 804 is configured to establish a communication channel such that the wearable device 800 is connected to a peer communication end through the communication channel and exchanges data with the peer communication end through the communication channel. The RF part 804 may include wireless communication modules such as a wireless local area network (WLAN) module (for example, a WIFI module), a BT module, an NFC module, and a baseband module. The RF part 804 is used for communication between the parts in the wearable device and the peer communication end, and may support direct memory access.

In different implementation manners of the present disclosure, the communication modules in the RF part 804 are generally presented in a form of an integrated circuit chip, and may be selectively combined, without requiring that all the communication modules be included. For example, the RF part 804 may include only a baseband chip, a radio frequency chip, and a corresponding antenna in order to provide a communication function in a cellular communications system. Through a wireless communication connection, for example, WLAN (for example, WIFI) access or wideband code division multiple access (WCDMA), established by the RF part 804, the wearable device 800 may be connected to a cellular network or the Internet. In some optional implementation manners of the present disclosure, the communication modules, for example, the baseband module, in the RF part 804 may be integrated into the processor part 801. A typical example is an APQ+MDM series platform provided by QUALCOMMGOOGLE Incorporated.

The memory part 802 may be configured to store a software program and module. The processor part 801 runs the software program and module stored in the memory part 802 in order to execute various function applications of the wearable device 800 and implement data processing. The memory part 802 mainly includes a program storage area and a data storage area, where the program storage area may store an operating system and a software program that is required by at least one function, for example, an information transfer program, a text playback program, a sound playback program, and an image playback program, and the data storage area may store data (for example, audio data and a phone book) created by the wearable device 800. In a specific implementation manner of the present disclosure, the memory part 802 may include a volatile memory, for example, a nonvolatile dynamic random access memory (NVRAM), a phase change random access memory (PRAM), or a magnetoresistive random access memory (MRAM), and may further include a nonvolatile memory, for example, at least one disk storage device, an electrically erasable programmable read-only memory (EEPROM), or a flash memory device such as a negative-OR (NOR) flash memory or a negative-AND (NAND) flash memory. The nonvolatile memory stores an operating system and an application program that are executed by the processor part

801. The processor part 801 may load, from the nonvolatile memory, a running program and data to a memory, and store digital content to a large-capacity storage apparatus. The operating system includes various components and/or drivers that are configured to control and manage a routine system task such as memory management, storage device control, and power management and that are helpful for communication between all types of software and hardware. In an implementation manner of the present disclosure, the operating system may be the ANDROID operating system provided by GOOGLE Incorporated, the iOS operating system developed by APPLE COMPUTER Incorporated, the WINDOWS operating system developed by MICROSOFT Corporation, or the like, or may be an embedded operating system such as VXWORKS.

The sensor part 805 may include but is not limited to all types of sensors such as an accelerometer, a gyroscope, a magnetometer, a light sensor, a GPS, a heart rate sensor, a blood oxygen sensor, and an electroencephalogram sensor.

The power supply part 806 is configured to supply power to different parts of the wearable device 800 in order to maintain running of the wearable device. As a general understanding, the power supply part 806 may be a built-in battery, for example, a common lithium-ion battery or nickel-metal hydride (NiMH) battery, or may include an external power supply that directly supplies power to the wearable device, for example, an alternating current (AC) adapter. In some implementation manners of the present disclosure, the power supply part 806 may be defined more widely, for example, may further include a power management system, a charging system, a power fault detection circuit, a power converter or inverter, a power status indicator (for example, a light-emitting diode), and any other component related to electric energy generation, management, and distribution of the wearable device.

In the wearable device 800 shown in FIG. 8, the processor part 801 may be configured to invoke the information transfer program stored in the memory part 802, and execute the following operations recording, by the processor part 801, a first event parameter corresponding to a social action to the memory part 802 when detecting, according to collected data reported by the sensor part 805, that a first user of the wearable device 800 performs the social action, where the first event parameter includes a first event time, a first event site, or an identifier of the first user, the first event time may be determined by the processor part 801 according to a clock of the processor part 801, and the first event site may be obtained by means of positioning by a GPS included in the sensor part 805 and be reported to the processor part 801 in real time, obtaining, by the processor part 801 through the RF part 804, a second event parameter released by a second wearable device, where the second event parameter includes a second event time, a second event site, or an identifier of a second user, and the second event parameter is an event parameter recorded by the second wearable device when the second wearable device detects that the second user wearing the second wearable device performs a social action, and determining, by the processor part 801, whether the first event parameter matches the second event parameter, and sending first user-defined information stored in the memory part 802 to the second wearable device through the RF part 804 if the first event parameter matches the second event parameter.

In an embodiment, determining, by the processor part 801, whether the first event parameter matches the second event parameter includes determining, by the processor part 801, whether the first event time matches the second event time, and/or determining whether the first event site matches the second event site, and/or determining whether the identifier of the first user matches the identifier of the second user.

In this embodiment of the present disclosure, the first event time includes a first event start time and first event duration, and the second event time includes a second event start time and second event duration, and determining, by the wearable device 800, whether the first event time matches the second event time includes determining, by the processor part 801, whether a difference between the first event start time and the second event start time is less than a first set threshold, determining, by the processor part 801, whether a difference between the first event duration and the second event duration is less than a second set threshold if the difference between the first event start time and the second event start time is less than the first set threshold, and determining that the first event time matches the second event time if the difference between the first event duration and the second event duration is less than the second set threshold.

Determining, by the processor part 801, whether the first event site matches the second event site includes determining, by the processor part 801, whether the first event site is the same as the second event site, and determining that the first event site matches the second event site if the first event site is the same as the second event site, or determining, by the processor part 801, whether a distance between the first event site and the second event site is less than a preset threshold, and determining that the first event site matches the second event site if the distance between the first event site and the second event site is less than the preset threshold.

Determining, by the processor part 801, whether the identifier of the first user matches the identifier of the second user includes determining, by the processor part 801, whether the identifier of the first user and the identifier of the second user belong to user identifiers of a same relationship chain, and determining that the identifier of the first user matches the identifier of the second user if the identifier of the first user and the identifier of the second user belong to the user identifiers of the same relationship chain.

In an embodiment, the processor part 801 invokes the information transfer program stored in the memory part 802, and may further execute the following operations, detecting, by the processor part 801 through the I/O system part 803, whether a social statement occurs when detecting, according to the collected data reported by the sensor part 805, that the first user wearing the wearable device 800 performs a social action, and executing the step of acquiring, through the RF part 804, a second event parameter released by a second wearable device if the social statement occurs.

In an embodiment, acquiring, by the processor part 801 through the RF part 804, a second event parameter released by a second wearable device includes acquiring, by the processor part 801 using an available network connection capability of the RF part 804, the second event parameter released by the second wearable device, and/or acquiring, by the processor part 801 using an available network connection capability of a first smart device, the second event parameter released by the second wearable device, where the RF part 804 keeps a communication connection with the first smart device, that is, the wearable device 800 keeps a communication connection with the first smart device.

In an embodiment, sending, by the processor part 801, first user-defined information stored in the memory part 802 to the second wearable device through the RF part 804 includes sending, by the processor part 801, the first user-defined information to the second wearable device using the available network connection capability of the RF part 804, and/or sending, by the processor part 801, the first user-defined information to the second wearable device using the available network connection capability of the first smart device, where the RF part 804 keeps a communication connection with the first smart device.

In an embodiment, the processor part 801 invokes the information transfer program stored in the memory part 802, and may further execute the following operations, releasing, by the processor part 801, the first event parameter using the available network connection capability of the RF part 804, and/or releasing, by the processor part 801, the first event parameter using the available network connection capability of the first smart device, where the RF part 804 keeps a communication connection with the first smart device.

In an embodiment, the processor part 801 invokes the information transfer program stored in the memory part 802, and may further execute the following operations acquiring, by the processor part 801 using the available network connection capability of the RF part 804, second user-defined information sent by the second wearable device, and/or acquiring, by the processor part 801 using the available network connection capability of the first smart device, second user-defined information sent by the second wearable device, where the RF part 804 keeps a communication connection with the first smart device, and the second user-defined information is sent to the wearable device 800 by the second wearable device after the second wearable device acquires the first event parameter and determines that the first event time matches the second event time and that the first event site matches the second event site.

In an embodiment, the first event parameter further includes a first social action type, and the second event parameter further includes a second social action type. Accordingly, the processor part 801 invokes the information transfer program stored in the memory part 802, and may further execute the following operation determining whether the first social action type is the same as the second social action type, and executing the foregoing operation of determining whether the first event parameter matches the second event parameter if the first social action type is the same as the second social action type.

In an embodiment, the processor part 801 invokes the information transfer program stored in the memory part 802, and may further execute the following operation, sending, by the processor part 801, a first user-defined rule to the first smart device through the RF part 804 such that the first smart device triggers, according to the first user-defined rule, an authorized IOT device to provide a service after determining that the first event time matches the second event time and that the first event site matches the second event site, where the first user-defined rule includes identifier information of at least one authorized IOT device.

In an embodiment, the first user-defined rule further includes identifier information of at least one authorized third-party search engine, and the second user-defined information includes personal information. Accordingly, the processor part 801 invokes the information transfer program stored in the memory part 802, and may further execute the following operations, sending, by the processor part 801, the second user-defined information and the first user-defined rule to a cloud server through the first smart device, where the RF part 804 keeps a communication connection with the first smart device, and acquiring, by the processor part 801 through the first smart device, second user background information sent by the cloud server, where the second user background information is second user background information that is obtained by the cloud server through the authorized third-party search engine after the cloud server extracts a keyword from the personal information included in the second user-defined information and that matches the keyword.

In an embodiment, the second user-defined information further includes an authorized third-party service information entrance. Accordingly, the processor part 801 invokes the information transfer program stored in the memory part 802, and may further execute the following operation, acquiring, by the processor part 801 through the first smart device, third-party service information sent by the cloud server, where the RF part 804 keeps a communication connection with the first smart device, and the third-party service information is third-party service information that is acquired from a third-party service system by the cloud server through the third-party service information entrance.

In an embodiment, the second user-defined information further includes identifier information of an authorized sign detection device. Accordingly, the processor part 801 invokes the information transfer program stored in the memory part 802, and may further execute the following operation, acquiring, by the processor part 801 through the first smart device, second user sign data synchronization information sent by the cloud server, where the second user sign data synchronization information is sent to the cloud server by the authorized sign detection device through a second smart device, the RF part 804 keeps a communication connection with the first smart device, and the second wearable device keeps a communication connection with the second smart device.

In an embodiment, the first event time includes a first event start time (that is, a start time of a social action detected by the wearable device) and first event duration (that is, duration of the social action detected by the wearable device), and the second event time includes a second event start time (that is, a start time of a social action detected by the second wearable device) and second event duration (that is, duration of the social action detected by the second wearable device). Accordingly, determining, by the processor part 801, whether the first event time matches the second event time and whether the first event site matches the second event site includes determining, by the processor part 801, whether a difference between the first event start time and the second event start time is less than a first set threshold (for example, 2 s), if the difference between the first event start time and the second event start time is less than the first set threshold, determining, by the processor part 801, whether a difference between the first event duration and the second event duration is less than a second set threshold (for example, 500 ms), and determining that the first event time matches the second event time if the difference between the first event duration and the second event duration is less than the second set threshold, and determining, by the processor part 801, whether the first event site (also referred to as a site at which the wearable device 800 detects a social action) is the same as the second event site (also referred to as a site at which the second wearable device detects a social action), and determining that the first event site matches the second event site if the first event site is same as the second event site.

Values of the foregoing first set threshold and second set threshold may be set as required, which are not limited in this embodiment of the present disclosure.

In an embodiment, the first user-defined information and the second user-defined information may be shown in Table 1, and include personal information, an authorized third-party service information entrance, and status information of an authorized sign detection device, which are not limited in this embodiment of the present disclosure.

In an embodiment, the first user-defined rule may be shown in Table 2, which is not limited in this embodiment of the present disclosure.

In this embodiment of the present disclosure, according to the wearable device 800 shown in FIG. 8, troublesome manual operations performed during transfer of information including an electronic contact card can be omitted, which can effectively improve information transfer efficiency. In addition, according to the wearable device 800 shown in FIG. 8, information can be efficiently transferred without a manual operation performed by a user for selecting a transfer object and information and without perception of the user, which can improve user experience in a business environment.

Implementing the information transfer method and the wearable device that are disclosed in the embodiments of the present disclosure may further bring the following beneficial effects:

1: Wearable devices perform information exchange by means of occurrence of a social action (for example, a handshake) in order to be better adapted to a complex networking condition. This case occurs more often in an actual situation and is of greater practical significance, improving user experience without participation and perception of a user.

2: By means of triggering of a social action (for example, a handshake), wearable devices can intelligently perform an association service of an IOT device by combining a specific scenario. The association service of the IOT device may be triggered according to comprehensive factors such as user settings, user sign data, and third-party service information (such as weather and site information), thereby giving better experience during socialization and guest reception.

3: By means of triggering of a social action (for example, a handshake), wearable devices not only can perform information exchange but also can push more background information of a communication object. For example, a keyword may be extracted from personal information to retrieve background information and push the retrieved background information to a user, which can improve user experience in communication. Moreover, the background information may be saved and recorded.

4: By means of triggering of a social action (for example, a handshake), wearable devices can synchronize more data analysis results of a sign detection device, thereby better knowing your communication object and improving a communication effect. For example, a data analysis result may be an analysis result of a person's attention concentration degree detected by a sign detection device such as an eyeball of smart glasses and electroencephalogram, or may be an analysis result of mental tension of data, such as a heartbeat and blood oxygen, detected by a wristwatch or another IOT device such that attention can be paid to an attention change of a communication object.

It should be noted that, in the embodiments of the present disclosure, various application scenarios may be derived based on a social action (in addition to a handshake, many social actions may be included), and in the application scenarios, a user can adjust an expression manner by knowing background information and a physical condition of a communication object, thereby improving an effect of communication with the communication object.

It should be noted that, in the embodiments of the present disclosure, "first", "second", and the like are merely used for mutual distinguishing, and do not indicate their importance, sequence, and the like. In this specification, "first wearable device", "second wearable device", and the like are used to distinguish wearable devices with different values, and do not indicate that they are of different types.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. It should be further appreciated by a person skilled in the art that the embodiments described in this specification all belong to exemplary embodiments, and the involved actions and modules are not necessarily required by the present application.

In the foregoing embodiments, the description of each embodiment has respective focuses. For a part that is not described in detail in an embodiment, reference may be made to related descriptions in other embodiments.

A person of ordinary skill in the art may understand that, all or a part of the steps in each method of the foregoing embodiments may be implemented by a program instructing related hardware (for example, a processor). The program may be stored in a computer readable storage medium. The storage medium includes a read-only memory (ROM), a random memory (RAM), a programmable read-only memory (PROM), an erasable programmable read-only memory (EPROM), a one-time programmable read-only memory (OTPROM), an EEPROM, a compact disc read-only memory (CD-ROM), another optical disk memory, magnetic disk memory, or magnetic tape memory, or any other computer-readable medium that can be configured to carry or store data.

The foregoing describes in detail the wearable device-based information transfer method and the related device that are disclosed in the embodiments of the present disclosure. In this specification, specific examples are applied to elaborate the principles and implementation manners of the present disclosure. The description of the foregoing embodiments is merely used to help understand the method of the present disclosure and the core idea of the method. In addition, a person of ordinary skill in the art makes changes to specific implementation manners and application scopes based on the idea of the present disclosure. In sum, the content in this specification shall not be understood as a limitation on the present disclosure.

What is claimed is:

1. A wearable device-based information transfer method comprising:
  recording, by a first wearable device, a first event parameter corresponding to a social action when detecting the social action at the first wearable device, wherein the first event parameter comprises at least one of a first event time, a first event site, or an identifier of a first user;
  receiving, by the first wearable device, a second event parameter released by a second wearable device using each of an available network connection capability of the first wearable device and an available network connection capability of a first smart device, wherein the first wearable device is configured to be in communication connection with the first smart device, wherein the second event parameter comprises at least one of a second event time, a second event site, or an identifier of a second user, and wherein the second event parameter is an event parameter associated with another social action at the second wearable device;

determining, by the first wearable device, whether the first event parameter matches the second event parameter;

sending, by the first wearable device, first user-defined information to the first smart device for transmission to the second wearable device using the available network connection capability of the first wearable device when the first event parameter matches the second event parameter; and releasing, by the first wearable device, the first event parameter to a first smart device using an available network connection capability of the first wearable device for transmission to a second wearable device.

2. The wearable device-based information transfer method of claim 1, wherein determining whether the first event parameter matches the second event parameter comprises determining, by the first wearable device, at least one of:

whether the first event time matches the second event time;

whether the first event site matches the second event site; or whether the identifier of the first user matches the identifier of the second user.

3. The wearable device-based information transfer method of claim 2, wherein the first event time comprises a first event start time and a first event duration, and wherein the second event time comprises a second event start time and a second event duration, and wherein determining whether the first event time matches the second event time comprises:

determining, by the first wearable device, whether a difference between the first event start time and the second event start time is less than a first set threshold;

determining, by the first wearable device, whether a difference between the first event duration and the second event duration is less than a second set threshold when the difference between the first event start time and the second event start time is less than the first set threshold; and determining that the first event time matches the second event time when the difference between the first event duration and the second event duration is less than the second set threshold.

4. The wearable device-based information transfer method of claim 2, further comprising receiving, by the first wearable device using the available network connection capability of the first wearable device, second user-defined information from the second wearable device after each of transmitting the first event parameter to the second wearable device and determining that the first event time matches the second event time and that the first event site matches the second event site.

5. The wearable device-based information transfer method of claim 4, further comprising:

sending, by the first wearable device, a first user-defined rule to the first smart device; and triggering, according to the first user-defined rule, at least one authorized Internet of Things (IoT) device for providing a service, wherein the first user-defined rule comprises identifier information of the at least one authorized IoT device.

6. The wearable device-based information transfer method of claim 5, wherein the first user-defined rule further comprises identifier information of at least one authorized third-party search engine, wherein the second user-defined information comprises personal information, and wherein the method further comprises:

sending, by the first wearable device, the second user-defined information and the first user-defined rule to a cloud server through the first smart device; and receiving, by the first wearable device through the first smart device, second user background information from the cloud server, wherein the second user background information is received from the cloud server through the authorized third-party search engine after the cloud server extracts a keyword from the personal information comprised in the second user-defined information and that matches the keyword.

7. The wearable device-based information transfer method of claim 6, wherein the second user-defined information further comprises an authorized third-party service information entrance, wherein the method further comprises receiving, by the first wearable device through the first smart device, third-party service information from the cloud server, and wherein the third-party service information is service information that is received from a third-party service system through the authorized third-party service information entrance.

8. The wearable device-based information transfer method of claim 7, wherein the second user-defined information further comprises identifier information of an authorized sign detection device, and wherein the method further comprises receiving, by the first wearable device through the first smart device, second user sign data synchronization information of the authorized sign detection device from the cloud server through a second smart device, and wherein the second wearable device is in communication with the second smart device.

9. The wearable device-based information transfer method of claim 2, wherein determining whether the first event site matches the second event site comprises:

determining, by the first wearable device, whether the first event site is the same as the second event site, and determining that the first event site matches the second event site when the first event site is the same as the second event site; or determining, by the first wearable device, whether a distance between the first event site and the second event site is less than a preset threshold, and determining that the first event site matches the second event site when the distance between the first event site and the second event site is less than the preset threshold.

10. The wearable device-based information transfer method of claim 2, wherein determining whether the identifier of the first user matches the identifier of the second user comprises:

determining, by the first wearable device, whether the identifier of the first user and the identifier of the second user belong to user identifiers of a same relationship chain; and determining that the identifier of the first user matches the identifier of the second user when the identifier of the first user and the identifier of the second user belong to the user identifiers of the same relationship chain.

11. The wearable device-based information transfer method of claim 1, further comprising:

detecting, by the first wearable device, whether a social statement occurs when detecting the social action at the first wearable device; and receiving the second event parameter when the social statement occurs.

12. The wearable device-based information transfer method of claim 1, wherein the first user-defined information comprises personal information, an authorized third-party service information entrance, and status information of an authorized sign detection device.

13. A wearable device comprising:

a memory comprising instructions; and a processor coupled to the memory, wherein the instructions cause the processor to be configured to:

record a first event parameter corresponding to a social action when detecting the social action at the wearable device, wherein the first event parameter comprises at least one of a first event time, a first event site, or an identifier of a first user;

receive a second event parameter released by a second wearable device using an available network connection capability of the wearable device, wherein the second event parameter comprises at least one of a second event time, a second event site, or an identifier of a second user, and wherein the second event parameter is an event parameter associated with another social action at the second wearable device;

receive, using a first smart device, the second event parameter from the second wearable device;

determine whether the first event parameter matches the second event parameter;

send, using the available network connection capability of the wearable device, first user-defined information to the second wearable device when the first event parameter matches the second event parameter; and release the first event parameter to the first smart device using an available network connection capability of the wearable device for transmission to the second wearable device.

14. The wearable device of claim 13, wherein the instructions further cause the processor to be configured to determine at least one of:

whether the first event time matches the second event time;

whether the first event site matches the second event site; or whether the identifier of the first user matches the identifier of the second user.

15. The wearable device of claim 14, wherein the first event time comprises a first event start time and a first event duration, and wherein the second event time comprises a second event start time and a second event duration, and wherein the instructions further cause the processor to be configured to:

determine whether a difference between the first event start time and the second event start time is less than a first set threshold;

determine whether a difference between the first event duration and the second event duration is less than a second set threshold when the difference between the first event start time and the second event start time is less than the first set threshold;

determine that the first event time matches the second event time when the difference between the first event duration and the second event duration is less than the second set threshold;

determine whether the first event site is a same site as the second event site, and determine that the first event site matches the second event site when the first event site is the same site as the second event site;

determine whether a distance between the first event site and the second event site is less than a preset threshold, and determine that the first event site matches the second event site when the distance between the first event site and the second event site is less than the preset threshold;

determine whether the identifier of the first user and the identifier of the second user belong to user identifiers of a same relationship chain; and determine that the identifier of the first user matches the identifier of the second user when the identifier of the first user and the identifier of the second user belong to the user identifiers of the same relationship chain.

16. The wearable device of claim 14, wherein the instructions further cause the processor to be configured to receive, using the available network connection capability of the wearable device, second user-defined information from the second wearable device after each of sending the first event parameter to the second wearable device and determining that the first event time matches the second event time and that the first event site matches the second event site.

17. The wearable device of claim 16, wherein the instructions further cause the processor to be configured to:

send a first user-defined rule to the first smart device; and trigger, according to the first user-defined rule, at least one authorized Internet of Things (IoT) device to provide a service, wherein the first user-defined rule comprises identifier information of the at least one authorized IoT device.

18. The wearable device of claim 17, wherein the first user-defined rule further comprises identifier information of at least one authorized third-party search engine, wherein the second user-defined information comprises personal information, and wherein the instructions further cause the processor to be configured to:

send the second user-defined information and the first user-defined rule to a cloud server through the first smart device; and receive, through the first smart device, second user background information from the cloud server, wherein the second user background information is received from the cloud server through the authorized third-party search engine after the cloud server extracts a keyword from the personal information comprised in the second user-defined information and that matches the keyword.

19. The wearable device of claim 18, wherein the second user-defined information further comprises an authorized third-party service information entrance, wherein the instructions further cause the processor to be configured to receive, through the first smart device, third-party service information from the cloud server, and wherein the third-party service information is service information that is received from a third-party service system through the authorized third-party service information entrance.

20. The wearable device of claim 19, wherein the second user-defined information further comprises identifier information of an authorized sign detection device, wherein the instructions further cause the processor to be configured to receive, through the first smart device, second user sign data synchronization information of the authorized sign detection device from the cloud server through a second smart device, and wherein the second wearable device is in communication with the second smart device.

21. The wearable device of claim 13, wherein the instructions further cause the processor to be configured to:
   detect whether a social statement occurs when detecting that the wearable device performs the social action; and
   receive the second event parameter when the social statement occurs.

22. The wearable device of claim 13, wherein the first user-defined information comprises personal information, an authorized third-party service information entrance, and status information of an authorized sign detection device.

* * * * *